(12) United States Patent
Van Gerwen

(10) Patent No.: US 9,949,493 B2
(45) Date of Patent: Apr. 24, 2018

(54) MASS SUPPLY SYSTEM

(71) Applicant: GEA FOOD SOLUTIONS BAKEL B.V., Bakel (NL)

(72) Inventor: Hendrikus Petrus Gerardus Van Gerwen, Someren (NL)

(73) Assignee: GEA FOOD SOLUTIONS BAKEL B.V., Bakel (NL)

( * ) Notice: Subject to any disclaimer, the term of this patent is extended or adjusted under 35 U.S.C. 154(b) by 0 days.

(21) Appl. No.: 14/333,848

(22) Filed: Jul. 17, 2014

(65) Prior Publication Data
US 2014/0342072 A1 Nov. 20, 2014

Related U.S. Application Data

(63) Continuation of application No. PCT/EP2013/050832, filed on Jan. 17, 2013.

(30) Foreign Application Priority Data

Jan. 20, 2012 (EP) .................................... 12000358
Apr. 26, 2012 (EP) .................................... 12002968

(51) Int. Cl.
*A22C 7/00* (2006.01)
*F01C 21/08* (2006.01)
(Continued)

(52) U.S. Cl.
CPC .......... *A22C 7/0076* (2013.01); *A22C 7/0069* (2013.01); *A23L 13/00* (2016.08);
(Continued)

(58) Field of Classification Search
CPC ....... A22C 7/00; A22C 7/0069; A22C 7/0076; A23L 1/00; A23L 1/31; A21C 5/003; A21C 5/04; B30B 11/001; B30B 11/003
(Continued)

(56) References Cited

U.S. PATENT DOCUMENTS 2,012,682 A * 8/1935 Johnson .................... A21C 5/00
425/239
2,657,413 A 11/1953 Elsaesser
(Continued)

FOREIGN PATENT DOCUMENTS

DE 102006020361 A1 8/2007
DE 102010026033 A1 1/2012
(Continued)

OTHER PUBLICATIONS

ISR and Written Opinion for application No. PCT/EP2013/050832 dated Sep. 25, 2013.
(Continued)

*Primary Examiner* — Seyed Masoud Malekzadeh
(74) *Attorney, Agent, or Firm* — The Dobrusin Law Firm, P.C.

(57) ABSTRACT

A system for forming a product. The system includes a hopper with a rotating feeder; a mold drum with cavities; and a feed pump with a moving member. The feed pump is configured to pump food mass from the hopper into the cavities. The system has means configured to determine: a position and a motion of the mold drum relative to a frame of the system; a position and a motion of the moving member of the feed pump relative to a housing of the feed pump; and a position and a motion of the rotating feeder relative to the hopper to synchronize the motion of the mold drum and the motion of the moving member of the feed pump and to synchronize the motion of the rotating feeder with the motion of the moving member of the feed pump. The system has at least two pressure sensors.

10 Claims, 22 Drawing Sheets

(51) Int. Cl.
*F04C 2/344* (2006.01)
*F04C 13/00* (2006.01)
*A23P 30/10* (2016.01)
*A23L 13/00* (2016.01)
*A21C 5/04* (2006.01)
*A21C 5/00* (2006.01)

(52) U.S. Cl.
CPC .......... *A23P 30/10* (2016.08); *F01C 21/0836* (2013.01); *F04C 2/3441* (2013.01); *F04C 13/00* (2013.01); *A21C 5/003* (2013.01); *A21C 5/04* (2013.01); *A22C 7/00* (2013.01); *A23V 2002/00* (2013.01)

(58) Field of Classification Search
USPC ........................................ 425/239, 240, 241
See application file for complete search history.

(56) References Cited

U.S. PATENT DOCUMENTS

| | | |
|---|---|---|
| 3,177,524 A | 4/1965 | Gause |
| 3,205,837 A | 9/1965 | Ray |
| 3,213,486 A | 10/1965 | Blake |
| 3,347,176 A | 10/1967 | Hall |
| 3,724,026 A | 4/1973 | Gernandt |
| 3,742,556 A | 7/1973 | Beasley |
| 3,750,232 A | 8/1973 | Holly |
| 3,773,448 A * | 11/1973 | Poot .................. A21C 5/003 425/239 |
| 3,823,633 A | 7/1974 | Ross |
| 3,922,755 A | 12/1975 | Righele et al. |
| 3,991,440 A | 11/1976 | Hendrickson, Jr. |
| 3,998,574 A | 12/1976 | Blake |
| 4,054,967 A | 10/1977 | Sandberg et al. |
| 4,097,961 A | 7/1978 | Richards |
| 4,182,003 A | 1/1980 | Lamartino et al. |
| 4,418,446 A | 12/1983 | Sandberg |
| 4,625,612 A | 12/1986 | Oliver |
| 4,630,425 A | 12/1986 | Reed |
| 4,630,426 A * | 12/1986 | Gentry .................. B65B 9/04 426/414 |
| 4,768,325 A | 9/1988 | Lindee et al. |
| 4,768,941 A | 9/1988 | Wagner |
| 4,801,258 A * | 1/1989 | Hayashi ............... B30B 11/003 418/15 |
| 4,828,863 A * | 5/1989 | Aoki .................... A21C 5/04 222/381 |
| 4,832,961 A * | 5/1989 | Aoki .................... A21C 5/00 222/381 |
| 4,957,420 A * | 9/1990 | Furuhama ............. F01C 21/08 418/255 |
| 4,975,033 A | 12/1990 | Righele et al. |
| 4,987,643 A | 1/1991 | Powers |
| 4,995,804 A * | 2/1991 | Hirabayashi ........... A23P 30/20 418/15 |
| 5,102,238 A | 4/1992 | Contzen |
| 5,980,228 A | 11/1999 | Soper |
| 6,131,372 A | 10/2000 | Pruett |
| 6,371,278 B1 | 4/2001 | Hart et al. |
| 6,238,196 B1 | 5/2001 | Hyllstam et al. |
| 6,368,092 B1 | 4/2002 | Lindee |
| 6,764,293 B2 | 7/2004 | Kashulines et al. |
| 7,021,922 B2 | 4/2006 | Azzar |
| 2005/0013895 A1 | 1/2005 | Azzar |
| 2005/0042321 A1 | 2/2005 | LaBruno |
| 2005/0041697 A1 | 5/2005 | Gosz et al. |
| 2005/0106282 A1 | 5/2005 | Gosz et al. |
| 2005/0214399 A1 | 9/2005 | LaBruno et al. |
| 2005/0220932 A1* | 10/2005 | van der Eerden ... A22C 7/0069 426/1 |
| 2005/0230875 A1 | 10/2005 | Miller et al. |
| 2007/0295228 A1 | 12/2007 | Gosz et al. |
| 2008/0008799 A1* | 1/2008 | Zuger .................. A22C 7/0069 426/389 |
| 2008/0202226 A1 | 8/2008 | Heim Jens et al. |
| 2008/0230351 A1 | 9/2008 | Taylor et al. |
| 2008/0233228 A1* | 9/2008 | Lindee ................ A22C 7/0038 425/144 |
| 2011/0151082 A1 | 6/2011 | VanGerwen |
| 2013/0045294 A1 | 2/2013 | Van Gerwen et al. |
| 2013/0164403 A1 | 6/2013 | Boogers et al. |
| 2013/0224357 A1 | 8/2013 | Van Gerwen |
| 2013/0273192 A1 | 10/2013 | Van Gerwen |
| 2013/0280393 A1 | 10/2013 | Van Gerwen |
| 2013/0291483 A1 | 11/2013 | Van Gerwen |
| 2013/0337128 A1 | 12/2013 | Van Gerwen et al. |
| 2014/0295018 A1 | 10/2014 | Van Der Eerden et al. |
| 2015/0282520 A1 | 10/2015 | Meskendahl et al. |

FOREIGN PATENT DOCUMENTS

| | | |
|---|---|---|
| EP | 0818148 A1 | 1/1998 |
| EP | 1520480 A1 | 4/2005 |
| EP | 1676490 A1 | 7/2006 |
| EP | 1920847 A1 | 5/2008 |
| EP | 2064956 A1 | 6/2009 |
| EP | 2253219 A2 | 11/2010 |
| FR | 2387609 A1 | 11/1978 |
| GB | 1015820 A | 1/1966 |
| GB | 2312641 A | 11/1997 |
| JP | S52-51076 A | 4/1977 |
| JP | H02-037195 A | 2/1990 |
| JP | 2001299317 A | 10/2001 |
| JP | 2005-530514 A | 10/2005 |
| WO | 88/07003 A1 | 9/1988 |
| WO | 96/09210 A1 | 3/1996 |
| WO | 98/12934 A1 | 4/1998 |
| WO | 2004/002229 A2 | 1/2004 |
| WO | 2005/0009696 A1 | 2/2005 |
| WO | 2005/009696 A1 | 2/2005 |
| WO | 2005-041697 A2 | 5/2005 |
| WO | 2005/107481 | 11/2005 |
| WO | 2006/020139 A1 | 2/2006 |
| WO | 2008/091634 A2 | 7/2008 |
| WO | 2010/110655 A1 | 9/2010 |
| WO | 2012/012581 A1 | 1/2012 |
| WO | 2012/055454 A2 | 5/2012 |
| WO | 2012/059188 A1 | 5/2012 |
| WO | 2012/107236 A2 | 8/2012 |
| WO | 2012/161577 A1 | 11/2012 |

OTHER PUBLICATIONS

Potentially related Application, U.S. Appl. No. 13/883,152 Published as 2013/0224357, Aug. 29, 2013.
Potentially related Application, U.S. Appl. No. 13/988,360 Published as 2013/0280393, Oct. 24, 2013.
Potentially related Application, U.S. Appl. No. 13/944,973 Published as 2013/0273192, Oct. 17, 2013.
Potentially related Application, U.S. Appl. No. 13/980,778 Published as 2013/0291483, Nov, 7, 2013.
Potentially Related Application, U.S. Appl. No. 13/982,377, filed Sep. 5, 2013, published as 2013/0337128, on Dec. 19, 2013.
International Preliminary Report on Patentability, Application No. PCT/EP2013/050832 dated Jul. 29, 2014.
Chinese office action for Chinese application No. 2013800006210.5, dated Jun. 29, 2016.
Japanese Office Action for Japanese patent application No. 2014-552621, dated Nov. 21, 2016,

* cited by examiner

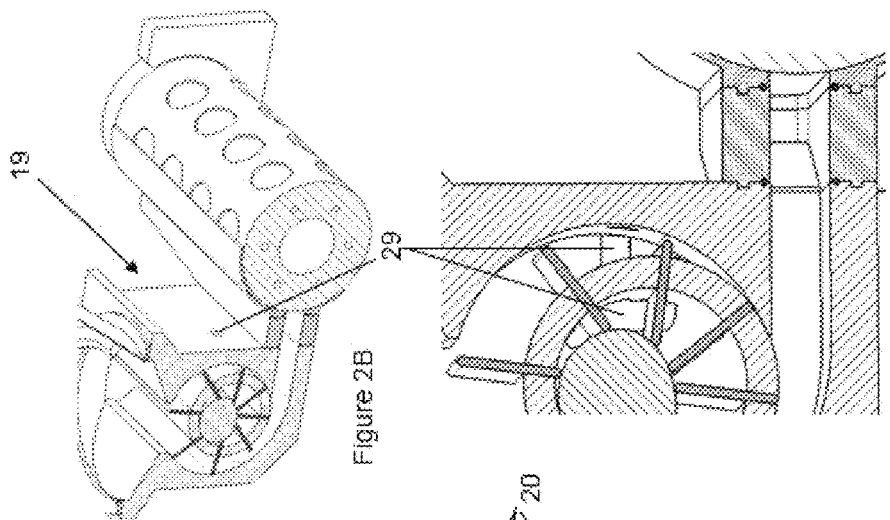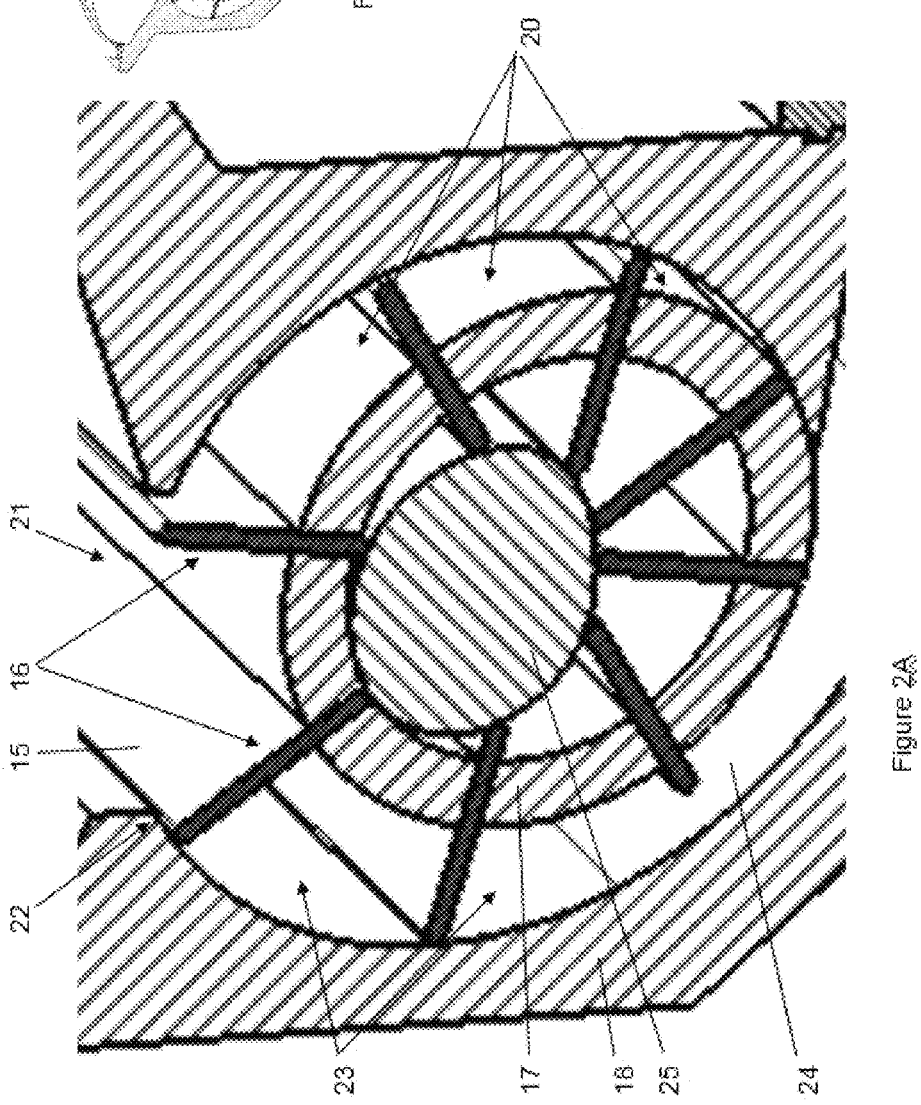

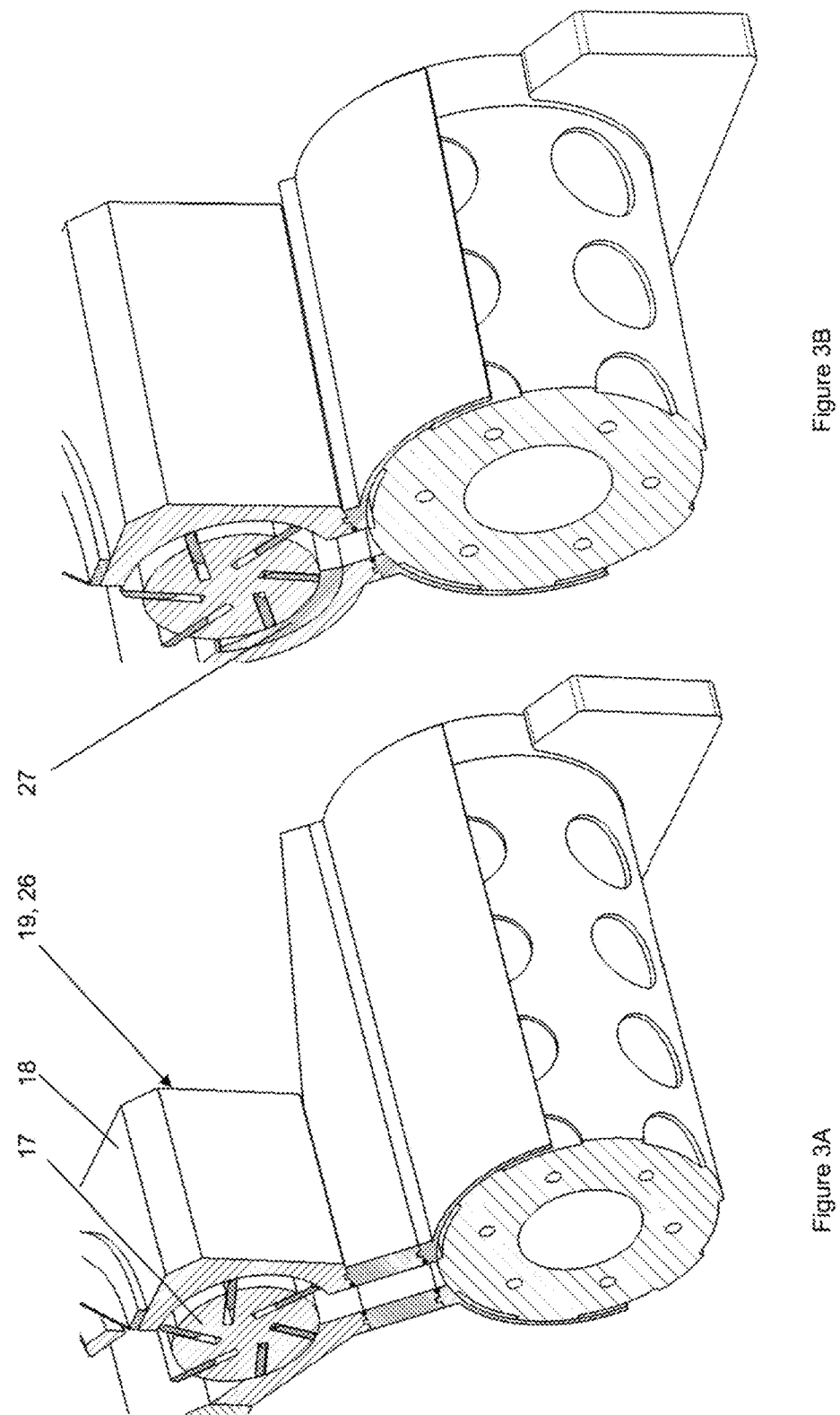

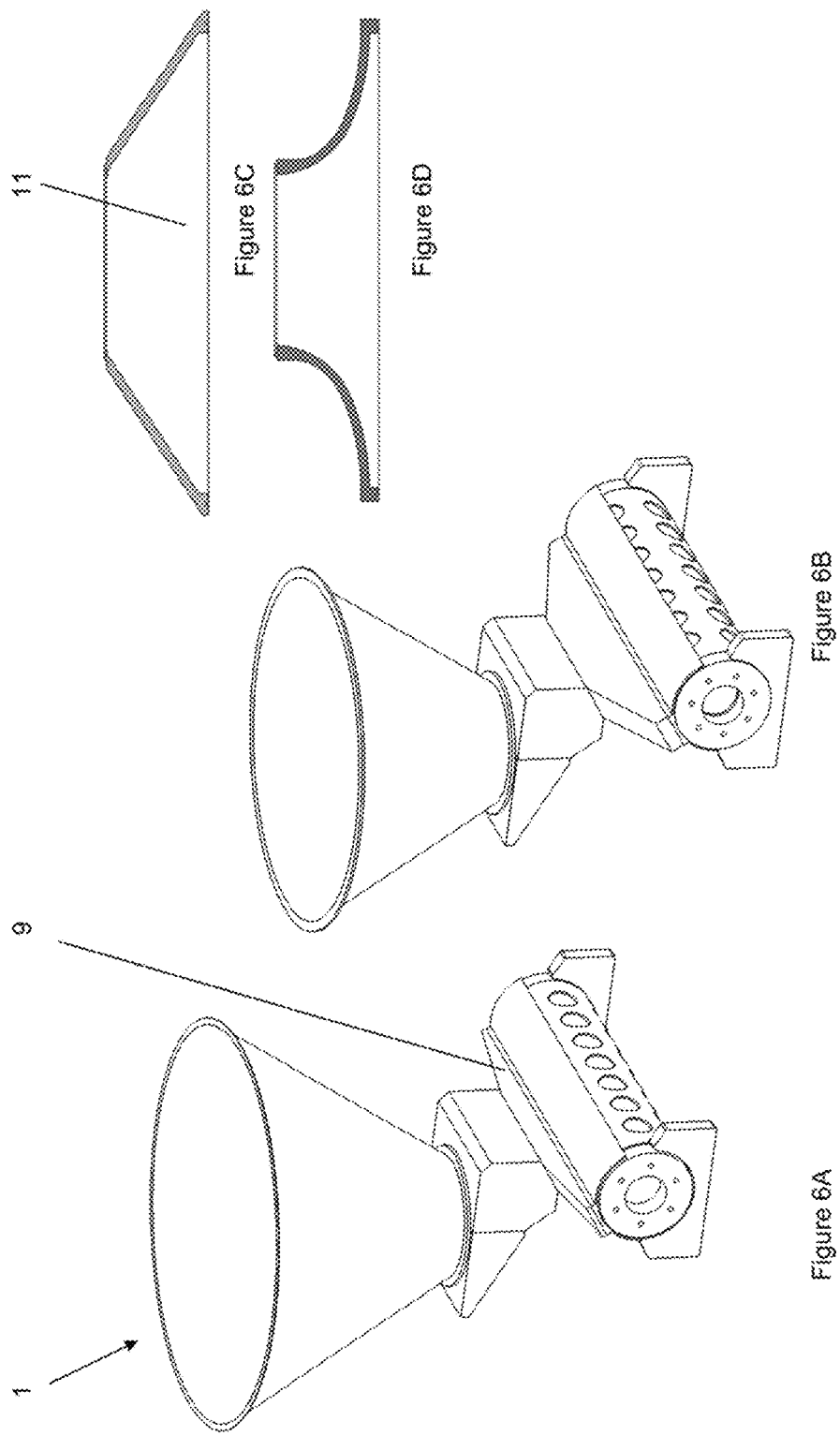

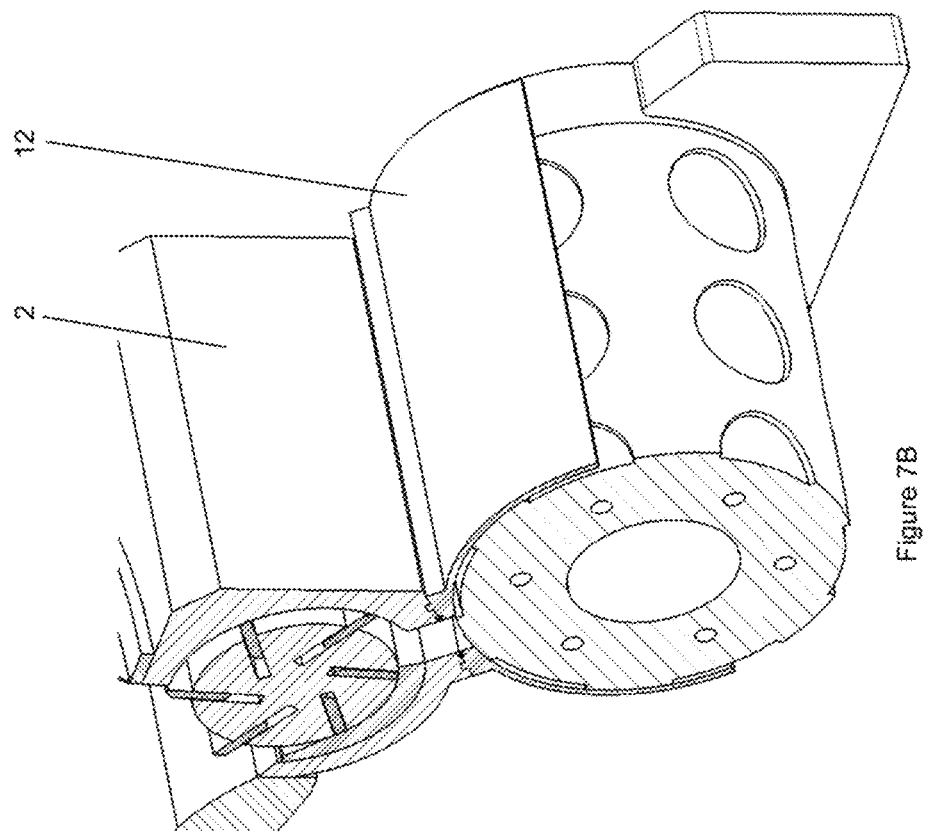
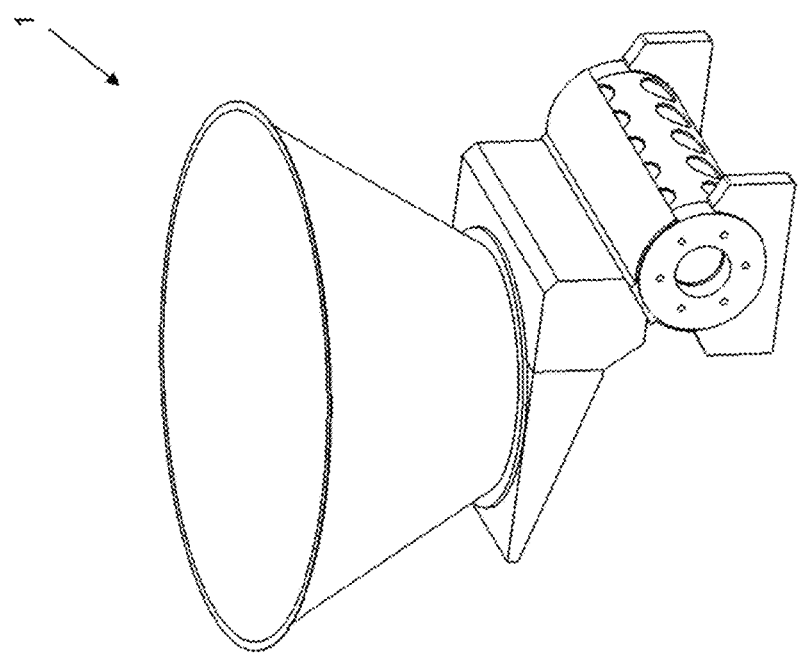
Figure 7A
Figure 7B

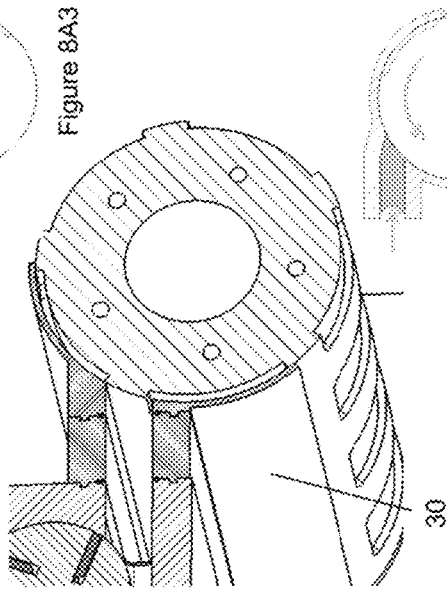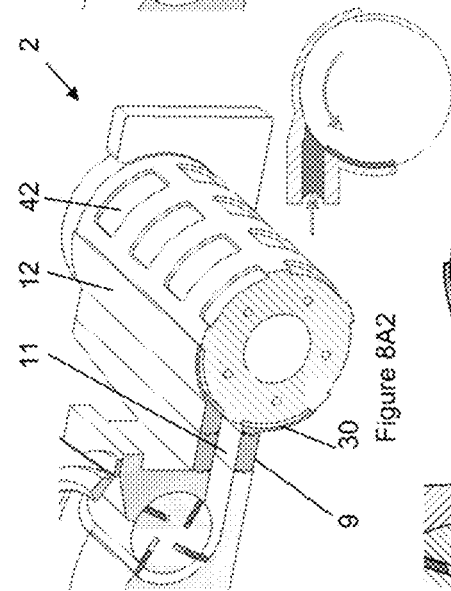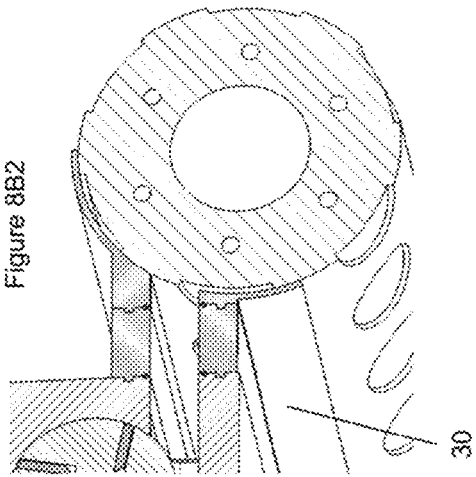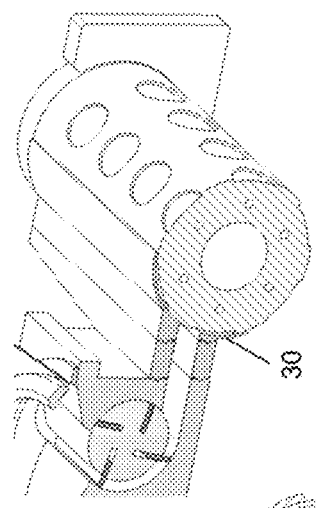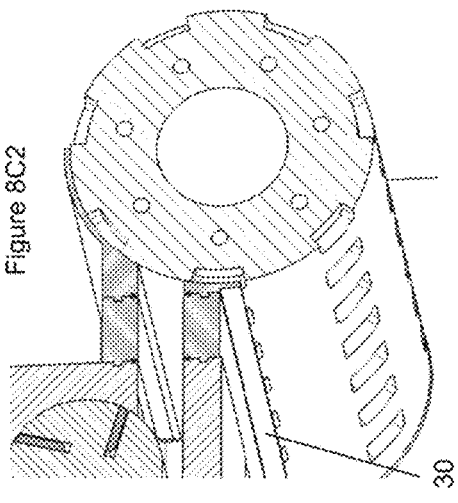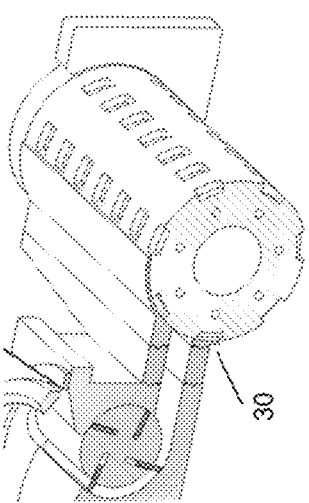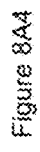

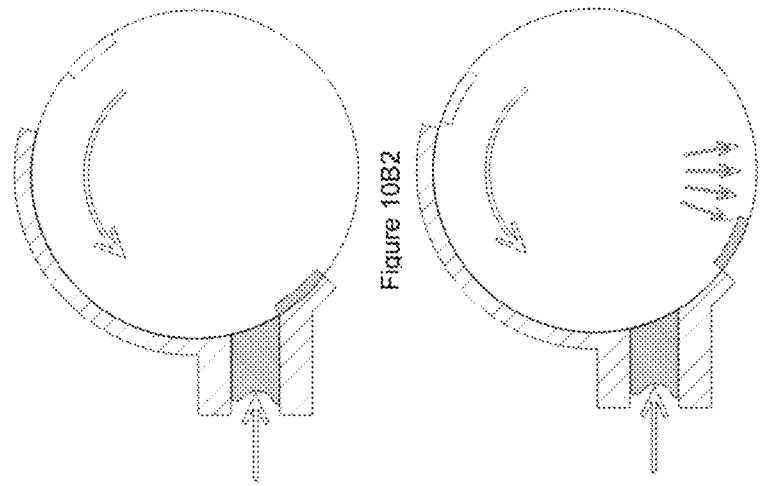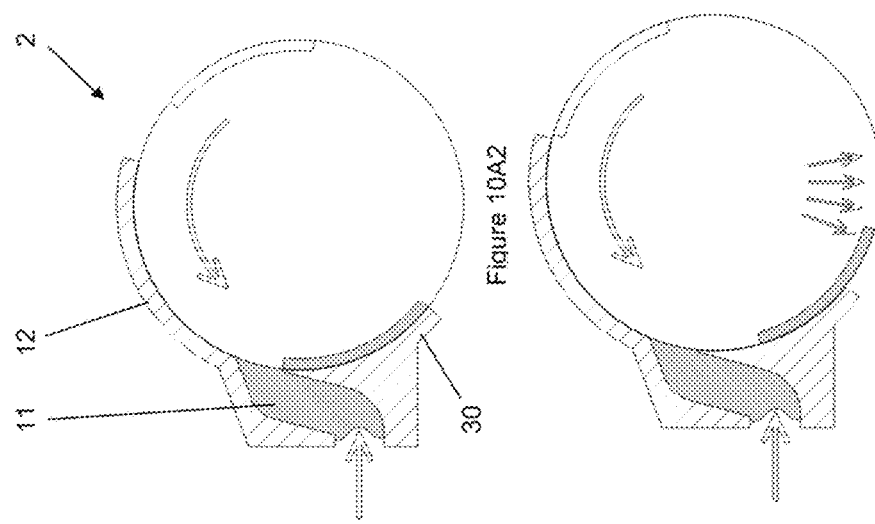

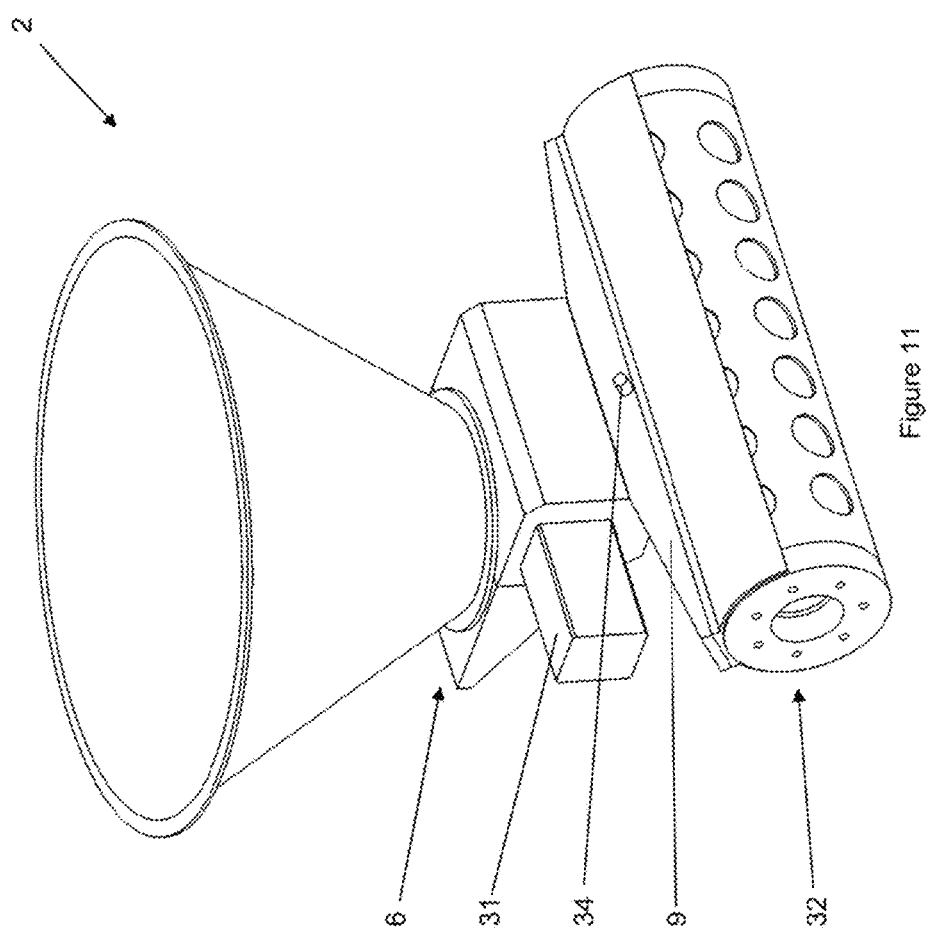

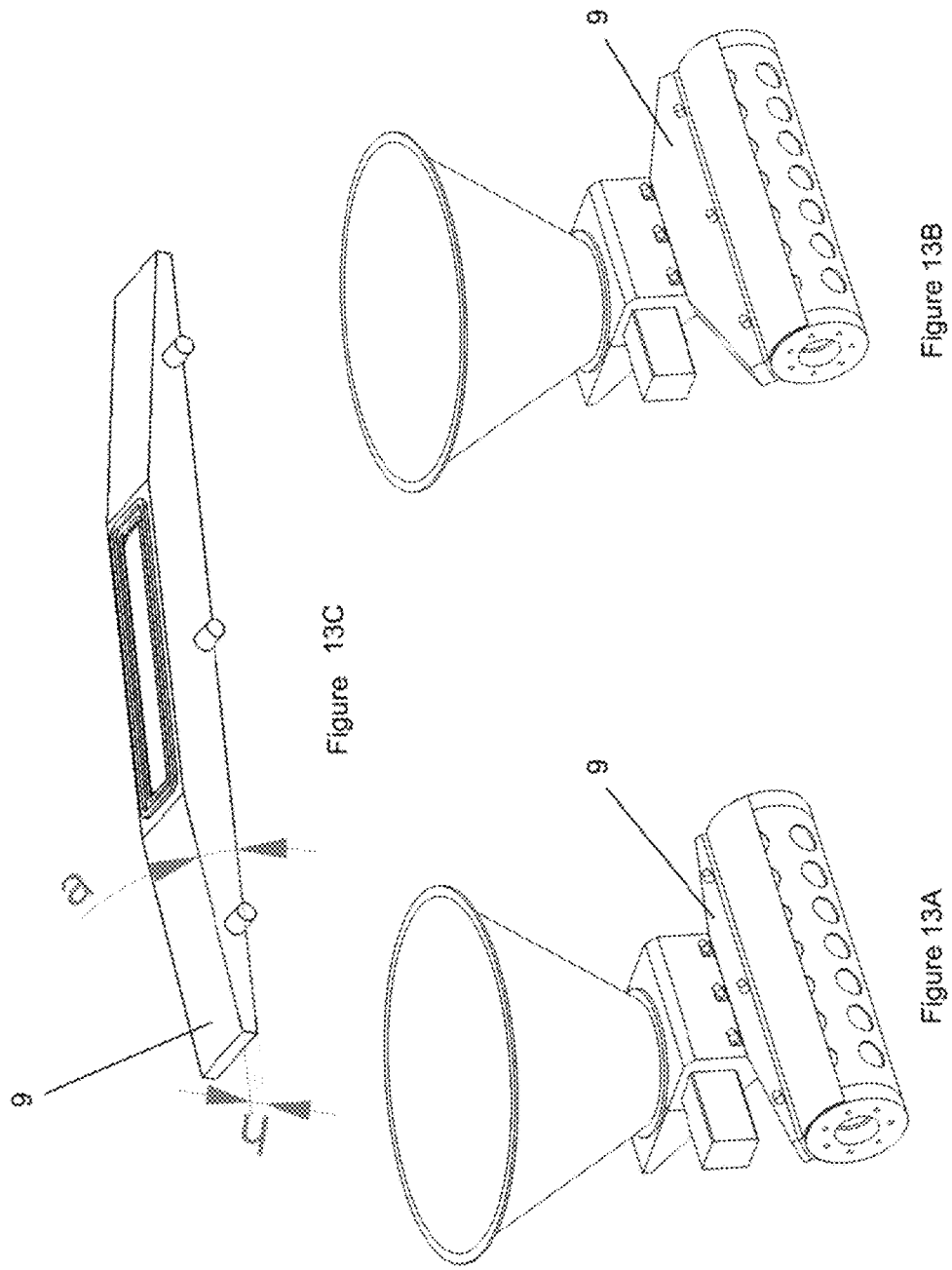

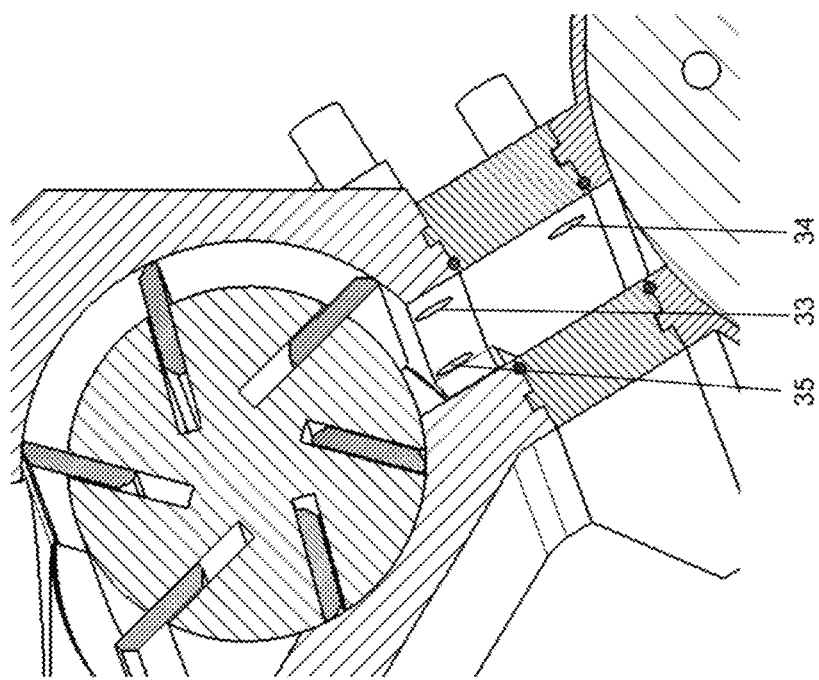
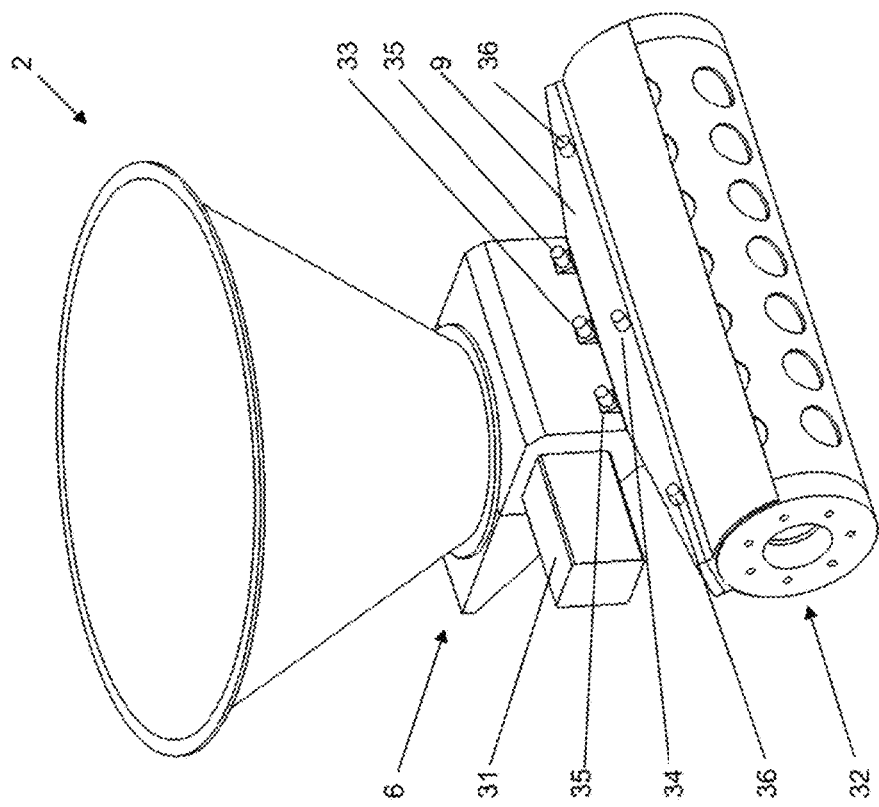

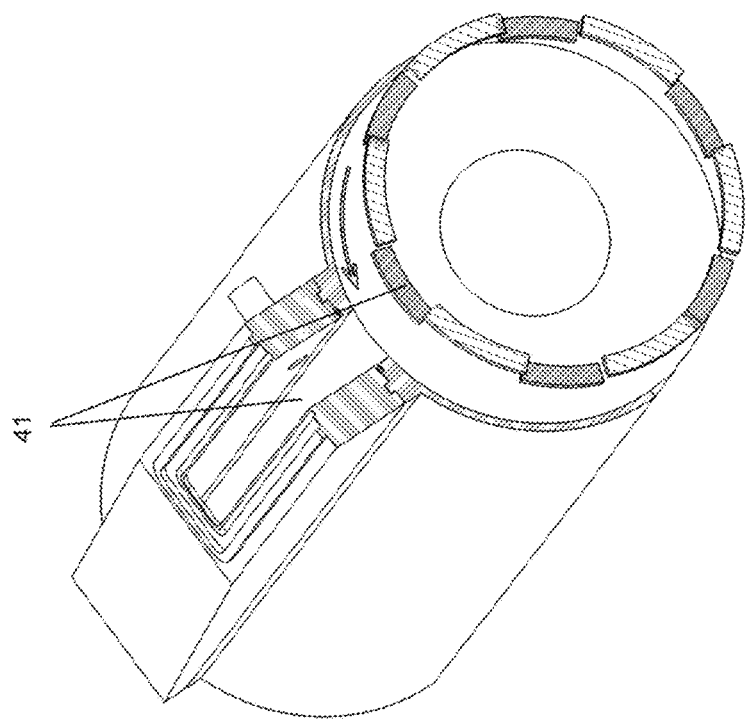
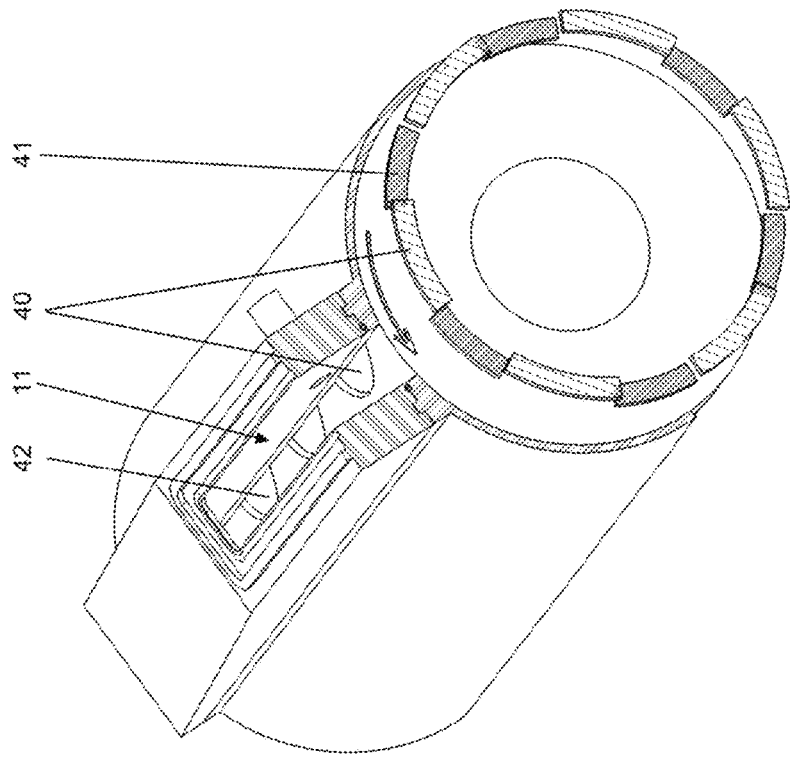

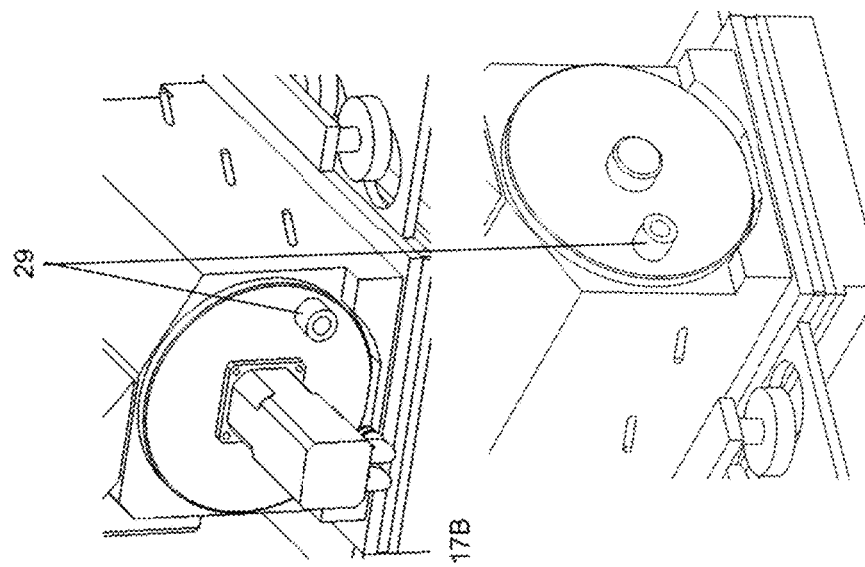
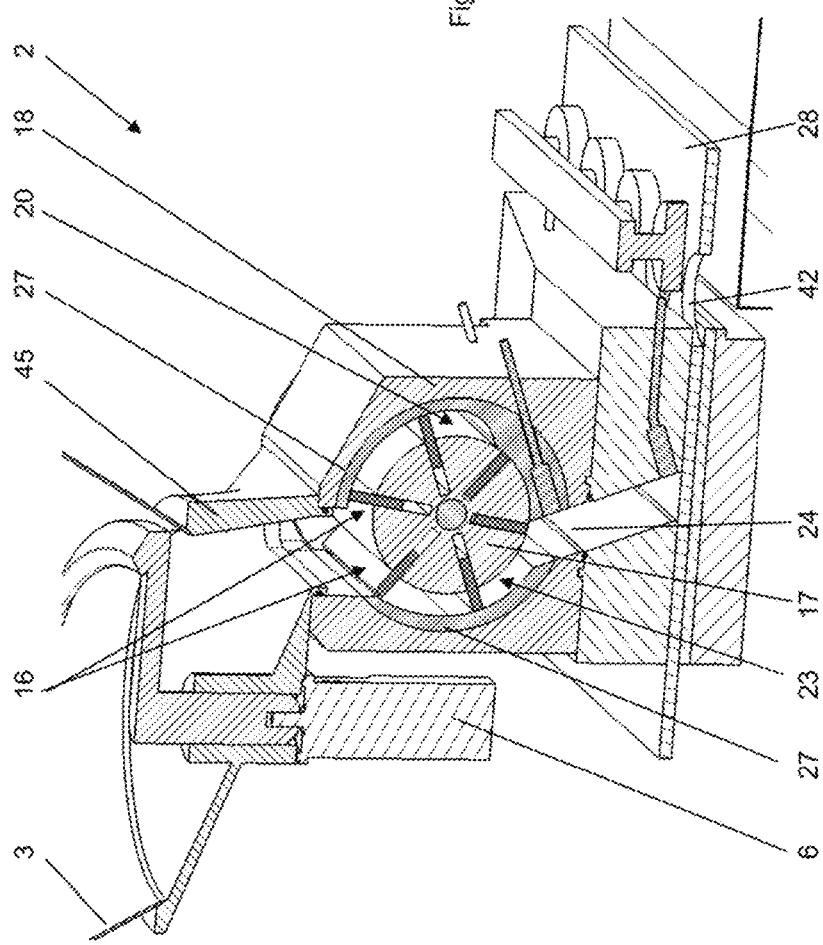
Figure 17A   Figure 17B   Figure 17C

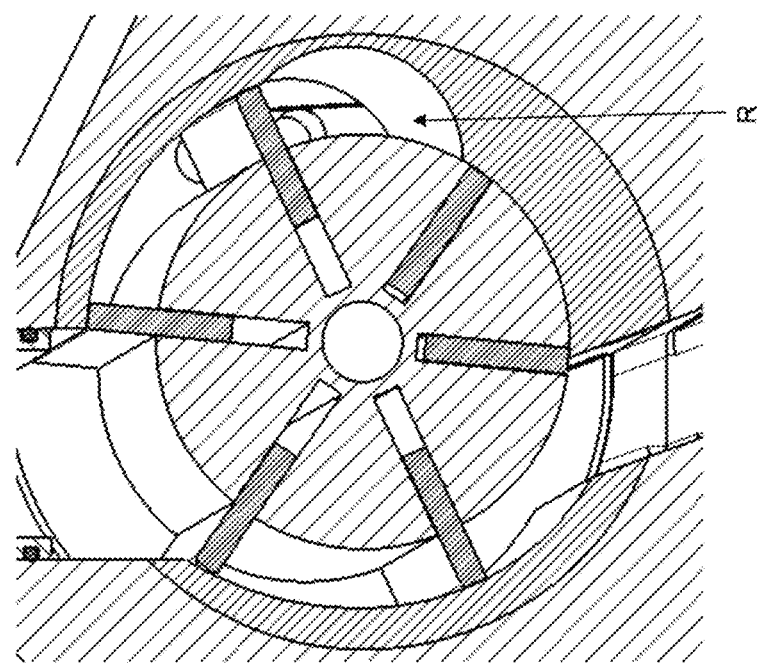
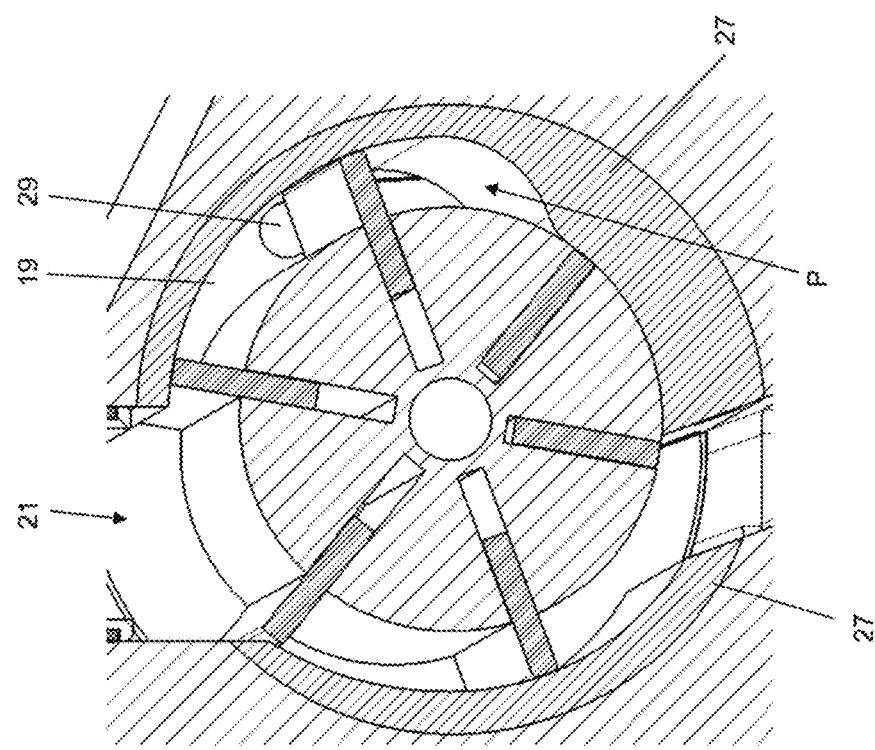
Figure 18A
Figure 18B

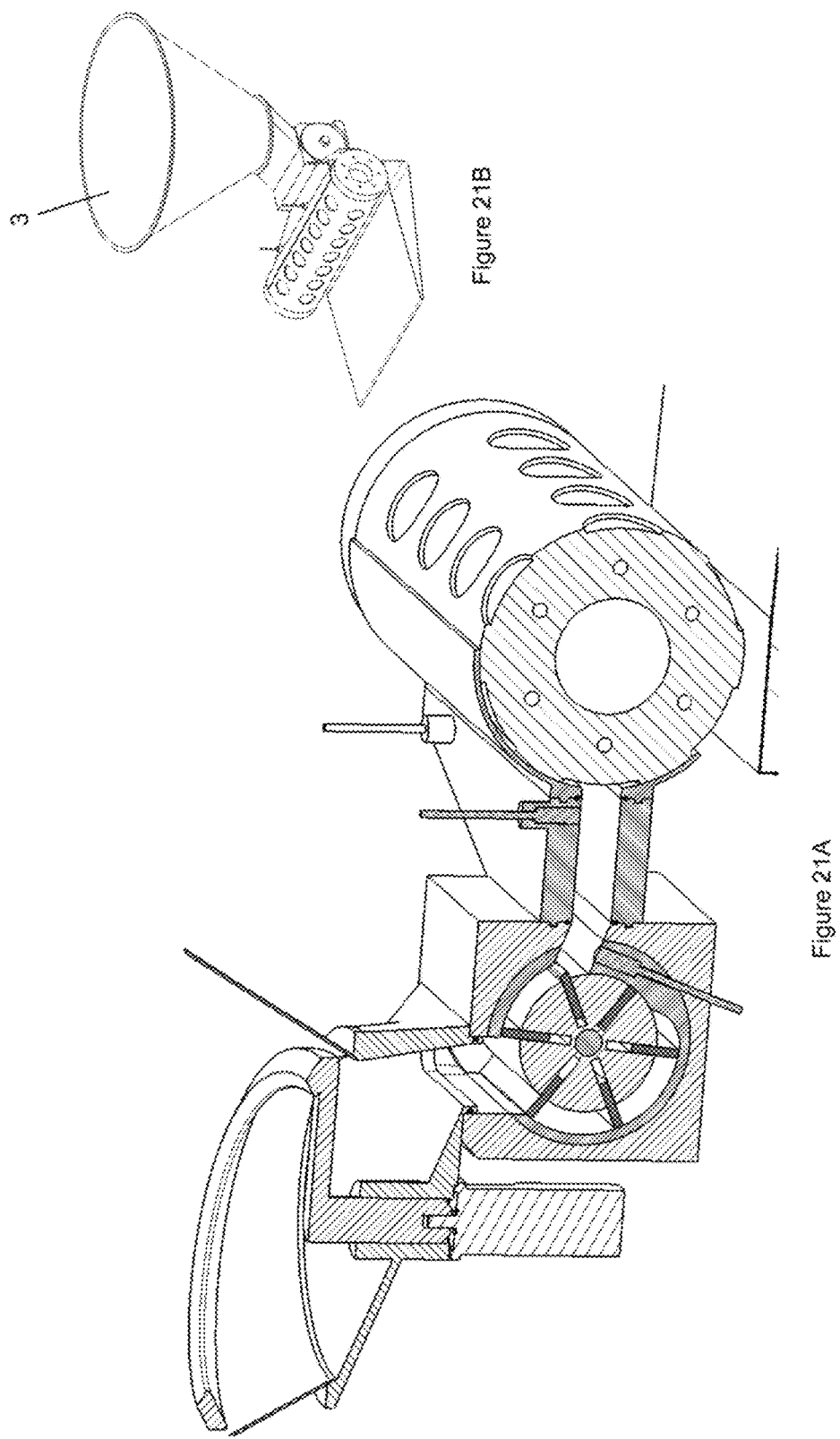

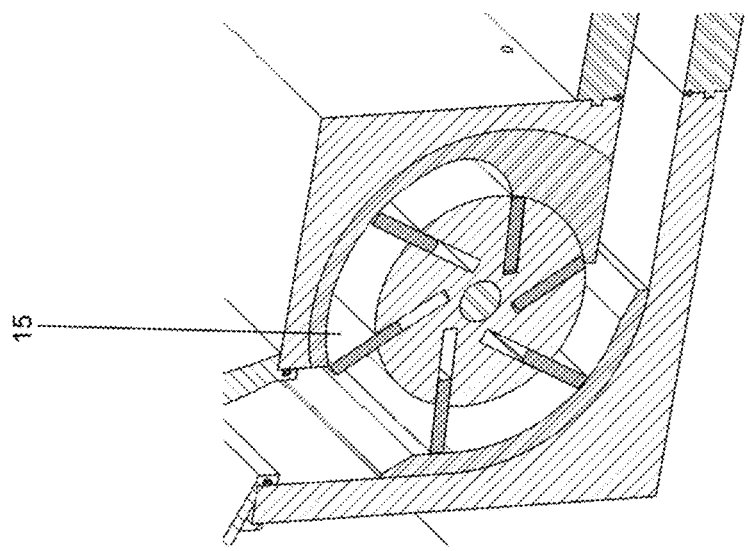
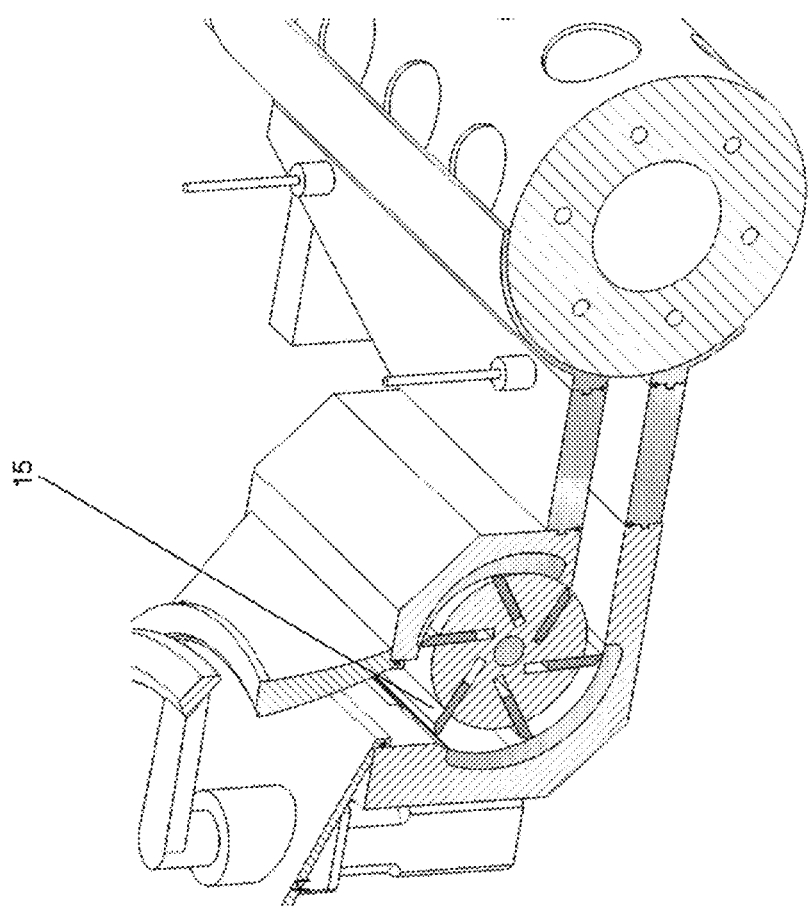

MASS SUPPLY SYSTEM

FIELD

The present invention relates to a system for forming a product from a food mass, the system comprising a mould member, e g. a mould drum with an axis of rotation and a feed pump.

BACKGROUND

Such systems are known from the state of the art and are used to form products, such as patties, from a food mass. The forming is carried out by means of a drum which comprises a multitude of cavities at its circumference. This drum rotates and during this rotation, the cavities are filled with the food mass and then the formed product is discharged and subsequently refilled. Preferably, a multitude of food products are formed and discharged simultaneously. However, the processes known from the state of the art are often complicated and for processing whole muscle meat not suitable.

It was therefore the objective of the present invention to provide a system and a process which do not comprise the deficiencies according to the state of the art and which are especially suitable for processing whole muscle meat and/or other sensitive food mass products.

SUMMARY

The problem is solved with a system for forming a product from a food mass, comprising a mould drum with an axis of rotation and a feed pump, whereas the feed pump is a positive displacement pump with a rotor, whose axis of rotation is parallel to the axis of rotation of the drum.

The disclosure made for this embodiment of the present invention also applies to the other embodiments of the present invention and vice versa.

The present invention relates to a system with a positive displacement pump and a rotating mould drum comprising cavities. The feed pump is a positive displacement pump with a rotor. The feed pump pumps the food mass from a hopper into the cavities of the mould drum in which the food mass is formed into the resulting food product, for example the patty.

The inventive system can be utilized for processing meat, fish, potatoes and vegetables like spinach. The inventive system is especially suitable for processing delicate and easily damaged products such as high-quality whole muscle meat products. The drum rotates from a filling position in which its cavities are filled with the food product to a discharge position in which the formed products are removed from the cavities.

The mold drum comprises mold cavities to form the products which preferably are at least partially made from a porous material, for example made from a sintered metal material. Each porous cavity is connected to a fluid passage, which more preferably extends in the longitudinal direction of the drum. During rotation of the drum from the discharge position to the fill position the cavities can preferably be filled with air. During filling of product in the product cavities, this air within the cavities will preferably be discharged through the porous walls of the at least partially porous cavities.

Additionally or alternatively, gas in the product, for example air, can be removed from the product through the porous material and via the fluid passage, for example to the ambient.

According to the present invention, the rotor of the feed pump is in parallel with the axis of rotation of the mould drum. Thus, the feed pump can be placed very near to the mould drum, which reduces the pressure loss in the connection between the feed pump and the drum and a more uniform pressure distribution over the axial length of the mould drum can be achieved. Preferably, the food mass is supplied to the feed pump in one angular position and discharged in an angular position downstream from the inlet. This configuration allows to adopt the axial length of the axial of the feed pump to axial length of the drum, which results in a more equal pressure distribution over the axial length of the mould drum.

Preferably, the system comprises a hopper. The food mass can be transported to the hopper in a continuous way for example by a belt but also batch-wise, for example via meat trolleys. The hopper is flow-wise connected to the feed pump and preferably comprises a feeder, preferably a rotating feeder, which feeds the food mass from the hopper to the feed pump. The pump is preferably a positive displacement pump, more preferably a radial vane-pump. This vane-pump comprises vanes, which are, preferably radially displaceable relative to a rotor. At one angular position the food mass is supplied to the pump, placed between two vanes and in an angular position downstream from the inlet, the food mass is discharged a mould member, for example a rotating mould drum. Between the inlet and the outlet, the food mass is compressed. The axial length of the vanes can be adapted to the axial length of the mould member. The distance between the centre line of the inlet and centre line of the outlet of the positive displacement pump, particularly the vane-pump, is as short as possible, however large enough to build up the necessary filling pressure. Preferably, the distance between the inlet and the outlet of the feed pump is less than 90° and more preferably more than 80°. This preferred embodiment results in a reduced stress of the structure of the food mass, particularly whole muscle meat.

Preferably the volume of the pump cavities of the feed pump, e.g. the volume between two vanes in the feed pump is tailor-made for the individual food mass and designed such that the pump cavities are always completely filled with food mass. This preferred embodiment results in less pulsation of meat mass at the outlet of the pump and/or in a more uniform pressure distribution along the axial length of the feed pump.

Preferably, the radial distance between two vanes, at least at their tip, is larger than the longest dimension of the individual pieces of the food mass to be pumped. This preferred embodiment results in less damage of the food mass.

Preferably, the vanes of the pump are exchangeable. More preferably, the pump is designed such, that vanes with different axial length can be utilized. For example, in order to pump whole muscle meat, for example chicken breasts, vanes with a longer radial length may be desirable than the radial length of vanes which are utilized to pump minced meat.

In a preferred or inventive embodiment of the present invention, the pump comprises one or more insert(s), which is/are placed into the housing of the pump. Each insert defines, at least partially, the outer circumference of the pumping chambers. Each insert is preferably exchangeable, depending on the product to be pumped. More preferably, the vanes are adapted to the respective insert.

Preferably, the axial length of the rotor of the feed pump and/or the outlet of the feed pump is at least essentially equal to the axial length of the mould member, e.g. the mould drum and/or the axial length of the outlet of the feed pump is essentially equal to the axial length of the mould member, e.g. the mould drum.

In case the axial length of the outlet of the feed pump is smaller than the axial length of the mould member, a divider is preferably used. The divider directs the food mass from the outlet of the feed pump to the mould cavities in the mould member, e.g. the rotating mould drum. More preferably, a seal is provided between the divider and the mould member, e.g. the mould drum or in case no divider is used between the outlet of the feed pump and the mould member, e.g. the mould drum. The seal can extend upstream and downstream from the divider or outlet of the feed pump. However, preferably, the seal extends only downstream from the divider or outlet of the feed pump.

Preferably, the feed pump is torque controlled and will maintain the filling pressure of the food mass.

Preferably, the divider is directly connected to the housing of the feed pump or integral with the housing of the feed pump. The seal can be integral with the divider or the housing of the feed pump. However, in a preferred embodiment, the seal is exchangeable connected to the divider or housing of the feed pump.

Another preferred or inventive embodiment of the present invention is a system for forming a product from a food mass, comprising a mould member and a feed pump, whereas the feed pump is connected to vacuum source.

The disclosure made for this embodiment of the present invention also applies to the other embodiments of the present invention and vice versa.

The mould member is, for example a plate that reciprocates linearly between two positions and/or a rotating drum. The mould member comprises, preferably a multitude, mould cavities, each cavity being adopted to form a food product from a food mass. Preferably a multitude of cavities is arranged in one row, i.e. filled and emptied simultaneously. One row extends parallel to the axis of rotation of a mould drum or perpendicular to the linear movement of the mould plate. The cavities can be, at least partially made from a porous material, for example a sintered material, Vacuum according to the present invention is a pressure below ambient pressure, e.g. 1 bar. The application of vacuum to the feed pump has the advantage that the cavities of the pump are more completely, preferably entirely filled and/or that the transport of the food mass from the hopper into the feed pump is supported. The vacuum source can be provided within the housing of the pump and/or externally. In a preferred embodiment of the present invention, the vacuum source is provided within the housing of the pump, for example by a displaceable, reciprocating piston and/or a membrane that is deformed to draw vacuum.

Preferably, the feed pump is a positive displacement pump, more preferably a vane-pump.

Preferably, the vacuum is applied to the feed pump prior to the inlet of the food mass. Preferably, the vacuum is applied between two vanes prior to filling them with food mass. In a preferred embodiment, at least one vane provides a sealing between the inlet of the pump and the vacuum source. Preferably, the pump is connected to a vacuum source via one or both front plates, which are attached to or part of the front end of the pumping chamber Preferably means, for example a membrane is provided to avoid that food mass gets into the vacuum channels. Another preferred or inventive embodiment of the present invention is a system for forming a product from a food mass, comprising a mould drum with an axis of rotation and a feed pump, whereas the feed pump comprises a rotor, which is made from a low density material, preferably a plastic- and/or an aluminum material.

The disclosure made for this embodiment of the present invention also applies to the other embodiments of the present invention and vice versa, This inventive or preferred embodiment of the present invention has the advantage that the feed pump has less inertia and can thus be operated more precisely and/or more dynamically and that the rotor can be more easily exchanged for cleaning-and/or process-modification-purposes.

Preferably, the feed pump is a positive displacement pump, more preferably a vane pump. Preferably the vanes of the vane-pump are also made from a low density-, preferably a plastic- and/or an aluminum material The feed pump is preferably driven by a stepper motor, an AC motor or a servo motor. The feed pump comprises a moving member, for example a rotor or a piston. Preferably, the motor or the pump comprises means to detect the current position of the moving member. This information is preferably forwarded to a control unit, which controls the motion of the moving member, for example based on the volume to be delivered by the feed pump and/or based on the filling pressure needed for filling the mould cavities.

According to another inventive or preferred embodiment of the present invention, the feed pump is a vane pump, with a compression zone, whereas, at least in the compression zone, preferably also in a transport zone and/or at the outlet, the tip of the vanes does not touch the housing of the feed pump; i.e there is a gap between the tip of the vanes of the pump and housing of the pump. Preferably, the size of the gap is adjustable, particularly by exchanging the vanes and/or the rotor of the pump.

This embodiment is particularly advantageous for whole muscle products, whose structure is not damaged in the feed pump, e.g. the food mass is not or not significantly cut in the vane pump. In the transport zone the product is transported into the feed pump, in the compression zone it is compressed to the desired feed pressure and in the outlet, the food mass is discharged from the feed pump.

Another preferred or inventive embodiment of the present invention is a system for forming a product from a food mass, comprising a mould member, e.g. a mould drum, and a feed pump whereas at least one pressure sensor is arranged between the outlet of the feed pump and the mould drum.

The disclosure made for this embodiment of the present invention also applies to the other embodiments of the present invention and vice versa.

The pressure sensor allows to determine the pressure of the food mass between the outlet of the feed pump and the mould drum. The operation of the feed pump and/or the motion of the mould member can be controlled with the signal of the pressure sensor. In case two or more pressure sensors are used, a pressure distribution over the axial length of the mould drum can be determined. Two or more pressure sensors arranged along the flow-direction of the food mass are particularly useful to determine the pressure loss between the outlet of the pump and the mould member and can be utilized to operate the pump more smoothly. Based on the pressure reading, the operation of the feed pump and/or the motion of the mould member, e.g. the rotation of the mould drum is preferably adjusted, particularly to achieve a more uniform pressure distribution over the axial length of the mould member. e.g. the mould drum and/or to achieve a minimum filling pressure everywhere over the axial length of the mould member and/or to achieve a complete filling of each mould cavity of the mould member. For example, in case the reading of a pressure sensor is below a set-point, the motion of the mould member is preferably reduced or stopped, more preferably until the pressure set value is reached again. Alternatively of additionally, the pumping capacity can be increased. In case the pressure is above a certain set point, the motion of the mould member can be increased and/or the pumping capacity can be decreased. The reading of the pressure sensor can be utilized to maintain a constant pressure at the outlet of the feed pump.

The operation of the feeder and/or the motion of the feed pump are preferably controlled by means of the signal of a pressure sensor. In case two or more pressure sensors are installed downstream of the feed pump, a pressure distribution over the axial length of the outlet of the feed pump can be determined, The signal of the pressure sensor is preferably also used during start up. The filling of the mould cavities, e.g. the motion of the mould member, is only started after a certain, preset pressure value at the outlet of the feed pump and/or in the feed channel has at least been reached. In another preferred embodiment, the discharge of a product from the mould cavity is only initiated in case the mould cavity has been filled with a certain feed pressure.

Preferably, the system, particularly the motion of the feed pump and the mould member are controlled such, that the mould cavities are filled essentially continuously and preferably with a constant pressure.

Preferably the system is self-adapting/self-adapting. The system recognizes certain schemes during the filling of the foregoing cavities and uses this information to adjust the filling process such, that the filling is optimized at an as low as possible feed pressure level.

Another preferred or inventive embodiment of the present invention is a system for forming a product from a food mass, comprising a mould member, for example a mould drum with an axis of rotation, and a feed pump with a moving member, for example a rotor, which comprises means to determine the position and/or the motion of the mould member relative to a frame of the system and/or the position and/or the motion of the moving member relative to the housing of the feed pump.

The disclosure made for this embodiment of the present invention also applies to the other embodiments of the present invention and vice versa.

Due to this preferred or inventive concept of the present invention, a control device, for example a PLC knows, essentially constantly, the position and/or the velocity of a mould member, for example the angular position of the mould drum or the linear position of a mould plate and its cavities and/or the position, e.g. the angular position of the moving member of the feed pump, preferably a positive displacement pump. Preferably, the system comprises a position/motion control unit. This unit determines the current position of the mould member, the feeder and/or the moving member of the feed pump and a computer program determines and controls its displacement, respectively, preferably the rotational or linear displacement of the mould member and/or the moving member of the motor and/or the rotational displacement of the feeder needed and controls the respective motor accordingly. Preferably, the motion of the mould member and the motion of the moving member of the feed pump are synchronized. By synchronizing the motion of the mould member and/or the moving part of the feed pump, the filling of the cavities can be optimized and/or the filling pressure can be reduced. Preferably, the motion of the pump follows the motion of the mould member or vice versa. The control unit preferably knows exactly when a mould cavity is adjacent to the outlet of the pump which must be filled and when no mould cavity is adjacent to the outlet of the feed pump which needs to filled. Accordingly the pumping capacity of the feed pump and/or the motion of the mould member can be controlled. For example during filling of a cavity, the pumping capacity is increased and/or the motion of the mould member is reduced. During the transition between two mould cavities, it is preferably the other way round. Preferably, the control device also knows the velocity of the mould member and/or the moving part of the feed pump and more preferably the velocity is controlled based on this information by a control unit. It is also preferred to increase the pressure of the food mass in the feed channel downstream of the feed pump before the next cavity or row of cavities approaches the feed channel to avoid a pressure drop below a desired set value as soon as the filling of the cavities starts.

Preferably each drive, particularly for the rotor of the feed pump and for the mould member is an electro motor or a hydraulic or pneumatic cylinder. The motor can comprise a rotating- or a linearly-moving moving member, for example a shaft. Preferably the motor comprises means to determine the rotational displacement of a moving member, for example a rotating shaft. The motor for the mould member and/or the rotor of the feed pump and/or the motor of the feeder is for example an AC motor with frequency control or a servo driven system.

An AC motor with frequency control will be suitable in most applications. A resolver, encoder, encoder-less (software will determine displacement of the moving member in the motor) or other, e.g. rotational, tracking means are preferably provided so that the displacement of the motor can be evaluated in a control unit for the detection of the current, e.g. angular, position of the mould member, e.g. mould drum and/or the, e.g. angular, position of the moving member of the feed pump and/or for controlling the speed of the mould member and/or the moving member of the feed pump. The motor that drives for example, the feed pump, the feeder and/or the mould member can also be a stepper motor.

Preferably, the motor comprises an energy recovery means to recover energy during deceleration of a motor, particularly the motor that drives the mould member, more preferably the mould plate which reciprocates between two positions The recovered energy is, far example used to drive the feed pump.

Preferably, the motion of the mould member and/or the motion of the moving member of the feed pump are controlled such that optimal filling of the cavities in the mould drum can be achieved with more preferably minimized pressure at the outlet of the fed pump. More preferably, the motion of the moving member, e.g. the rotor, of the feed pump is at least reduced after a cavity or a row of cavities is completely filled and before the filling of the next cavity or row of cavities starts. In case the filling pressure needed to fill a cavity completely is too low, the position/speed of the moving of the moving member of the feed pump can be changed/increased and/or the motion of the mould member can be at least reduced, preferably until the filling of the cavity or the row of cavities is completed. Since the PLC knows exactly the position of the mould member and its cavities, it knows exactly when the filling of each cavity starts and when it ends and/or when a cavity is in the discharge position and can optimize/control the filling and/or discharge step accordingly. It can also determine whether a cavity has been filled entirely. This information can be, for example, retrieved from a pressure reading. In case the respective cavity is not filled entirely, the respective product can be discharged and rejected or not discharged in the discharge position and the filling can be completed, when the respective mould cavity is in the filling position again. The parameters of the filling- and/or discharge process can be stored in the PLC and downloaded manually or automatically after the mould member has been placed in the inventive system. However, the parameters can also be set and adjusted manually.

Another preferred or inventive embodiment of the present invention is a system for forming a product from a food mass, comprising a mould member, e.g. a mould drum with an axis of rotation, and a feed pump, whereas the system does not comprises holding means downstream of the outlet of the feed pump.

The disclosure made for this embodiment of the present invention also applies to the other embodiments of the present invention and vice versa.

No holding means according to the present invention means, that the cavities are exposed to ambient pressure after their filling is completed. This inventive or preferred system has the advantage that smearing of the formed food mass is reduced and that hygienic- and wear-issues are reduced. The inventive system comprises fewer parts and/or has a reduced weight.

However, the system may comprise means, which avoid the unintentional removal of the formed products out of the mould cavities. Such means can be, for example vacuum means which is applied to the mould cavities. This means can also be controlled by a sensor, which, for example, detects the position of the respective mould cavity.

Preferably, the inventive system comprises a feeder, which is located in the hopper and is utilized to feed the food mass towards the feed pump. This feeder is preferably driven by a position controlled motor, for example an AC motor, a servomotor or a stepper motor. Preferably, the system comprises a motion control unit for the feeder. The motion control determines the current position of the feeder and a computer program determines and controls its displacement, preferably the rotational displacement needed, and controls the motor of the feeder accordingly, particularly to supply the right amount of food mass to the inlet of the feed pump. Thus, unnecessary compression of the food mass can be avoided and the control means of the feeder can be utilized to use the feed pump as a portioning device. The motion of the feeder is preferably synchronized with the motion of the feed pump.

Preferably the hopper comprises a sensor to determine its filling status and/or the filling status is determined by a pressure located in the outlet of the feed pump.

Another preferred or inventive embodiment of the present invention is a method to feed a food mass with a feed pump, preferably a positive displacement pump, comprising a moving member, for example rotor, to a mould member, for example a mould drum comprising mould cavities, whereas the motion of the moving member and the motion of the mould member are synchronized.

The disclosure made for this embodiment of the present invention also applies to the other embodiments of the present invention and vice versa.

By synchronizing the motion of the mould member and the moving part of the feed pump, the filling of the cavities can be optimized and/or the filling pressure can be reduced. The control unit preferably knows exactly when a mould cavity is adjacent to the outlet of the pump which must be filled and when no mould cavity is adjacent to the outlet of the feed pump which needs to filed. Accordingly the pumping capacity of the feed pump and/or the motion of the mould member can be adjusted. For example during filling of a cavity, the pumping capacity is increased and/or the motion of the mould member is reduced. During the transition between two mould cavities, it is preferably the other way round. Preferably, the control device also knows the velocity of the mould member and/or the moving part of the feed pump and more preferably the velocity is controlled based on this information by a control unit.

Another preferred or inventive embodiment of the present invention is a method to form a product from a food mass whereas it comprises at least one sensor and that the motion of a moving member of the feed pump and/or the motion of the mould member is controlled according to the signal of the sensor. Motion control includes position-velocity- and/or acceleration/deceleration-control. The sensor can be for example a pressure-sensor, a position sensor, a temperature-sensor and/or vision means, like a camera. A control unit receives the signal of the sensor, compares it with a set value and controls the motion of the motion of a moving member of the feed pump and/or the motion of the mould member accordingly. The discharge of the formed product can also be controlled based on the reading of a sensor.

The disclosure made for this embodiment of the present invention also applies to the other embodiments of the present invention and vice versa.

The disclosure made for this embodiment of the present invention also applies to the other embodiments of the present invention and vice versa.

The forming process will preferably be controlled by a control unit which is preferably part of the forming apparatus. In case that a separate mass supply system is used, the control unit can also be part of the mass supply system.

Another preferred or inventive embodiment of the present invention is a method to form a product from a food mass, whereas a positive displacement pump is used as a portioning device. During one cycle, the feed pump feeds only the volume of food mass towards the mould drum needed to fill a cavity or a row of cavities, e.g. a calculated or set volume of food mass per cavity or row of cavities. After this volume of food mass has been transferred to the drum, the speed of rotation of a rotor is preferably at least reduced, preferably stopped and more preferably reversed. Then the next cycle starts. The person skilled in the art understands that the feed pump can also be operated continuously and still be used as a portioning device.

Preferably, the pressure on the food mass in the feed channel is increased before the filling of the mould cavity starts to avoid that the pressure of the food mass drops below a certain value.

Preferably, the feed pump pumps as long as the mould cavities are filled, to avoid a pressure drop.

The disclosure made for this embodiment of the present invention also applies to the other embodiments of the present invention and vice versa.

Another preferred or inventive embodiment of the present invention is a method to fill a food mass into a mould cavity of a mould member, whereas the pressure on the food mass up-stream in the feed channel is released during and/or after the filling of a cavity or a row of cavities. This can be, for example achieved by reducing the speed of motion of the moving member of the feed pump or even reversing this motion during and/or after the filling of the respective cavity. Another option is a membrane by which the pressure in the pressure on the food mass in the feed channel towards the mould member can be released.

The disclosure made for this embodiment of the present invention also applies to the other embodiments of the present invention and vice versa.

Another preferred or inventive embodiment of the present invention is a method to fill a food mass into a mould cavity of a mould member, whereas immediately after the completion of the filling of a mould cavity, this mould cavity is, at least partially subjected to ambient pressure.

The disclosure made for this embodiment of the present invention also applies to the other embodiments of the present invention and vice versa.

Another preferred or inventive embodiment of the present invention is a method to fill a food mass into a mould cavity of a mould member and discharge the formed product from the mould cavity, whereas at least one sensor is provided and the discharge of the formed product out of the mould cavity is controlled according to the signal of the sensor. The pressure sensor is for example a pressure- a position sensor and/or a product sensor, like a camera. The system can control the exact position of the mould member and thus the exact position of the respective cavity at which the discharge of the formed product is initiated.

According to another or preferred embodiment of the present invention, the speed of rotation of the pump is altered during one complete revolution of the rotor. Preferably, the speed of rotation of the rotor of the pump is at least reduced during the filling of each pump chamber and then increased again, as soon as the filling of the respective pump chamber is completed. This particularly advantageous for the above described portioning mode, in which the volume of each pump chamber equals the volume of mass that is inserted into one row of cavities of the form member.

The disclosure made for this embodiment of the present invention also applies to the other embodiments of the present invention and vice versa.

In case pressure peaks on the mass occur between the mass supply system and the mould member, for example as a result of pulsation, with result that there will be weight difference of formed products in longitudinal direction of the mould member. These pressure peaks can be reduced and/or avoided by a pressure equalization system.

This pressure equalization system can be an accumulator which will be in direct contact with food mass and which can be positioned between the mass supply system and divider or can be part of mass transport means, can be part of divider and/or can be positioned between divider and mould member. Such an accumulator will for example be provided with a piston which piston is subject to the pressure of the mass. When the pressure on the mass increases the accumulator will accumulate mass and when the pressure on the mass decreases the accumulator will provide mass to the flow of mass between mass supply system and mould member to equalize the pressure on the mass.

In another embodiment or additionally a flexible element with a certain length can be positioned between the mass supply system and the divider or can be part of the mass transport means, can be part of divider, can be positioned between divider and mould member or the divider is in it entirely a flexible element.

This flexible element must be flexible perpendicular to the direction wherein the mass flows to equalize the pressure. When the pressure on the mass increase this flexible element will expand with result that the pressure will decrease. When the pressure on the mass will decrease below a certain value the flexible element will return to its original shape by the spring action of the material of the flexible element. When the mass transport means between pump and mould member is a circular shaped tube, a plastic hose suitable for use in the food industry can be used. How longer this hose, how more effective it will be.

Other ways to achieve a uniform pressure distribution over the axial length of the mould member can be achieved by the combination of (pressure) sensors, a dynamic drive system, control and software and will be described later in this document.

BRIEF DESCRIPTION OF THE DRAWINGS

The inventions are now explained according to the Figures, whereas this explanation does not limit the scope of protection The explanations apply to all inventions likewise.

FIGS. 2A, 2B, and 2C show an example of a positive displacement pump.

FIGS. 3A and 3B show another example of a positive displacement pump.

FIGS. 6A, 6B, 6C, and 6D show further examples of the food mass distribution over the axial length of the mould drum.

FIGS. 7A and 7B show a feed pump whose axial length is equal to the axial length of the mould drum.

FIGS. 8A1, 8A2, 8A3, 8A4, 8B1, 8B2, 8C1, 8C2 show the system with and without holding means.

FIGS. 10A1, 10A2, 10B1, and 10B2 show the system with and without holding means.

FIGS. 11, 12A, 12B, 13A, 13B, 13C, 14A, and 14B shows a system with at least one pressure sensor.

FIGS. 15A, 15B, 16A, and 16B illustrate the inventive process.

FIGS. 17A, 17B, and 17C show yet another embodiment of the inventive system.

FIGS. 18A and 18B show details of the vacuum channels.

FIGS. 21A and 21B show an embodiment with a low positioned pump.

FIG. 22A shows an embodiment with relatively short vanes.

FIG. 22B shows an embodiment with relatively large vanes.

DETAILED DESCRIPTION

Figure 1A:
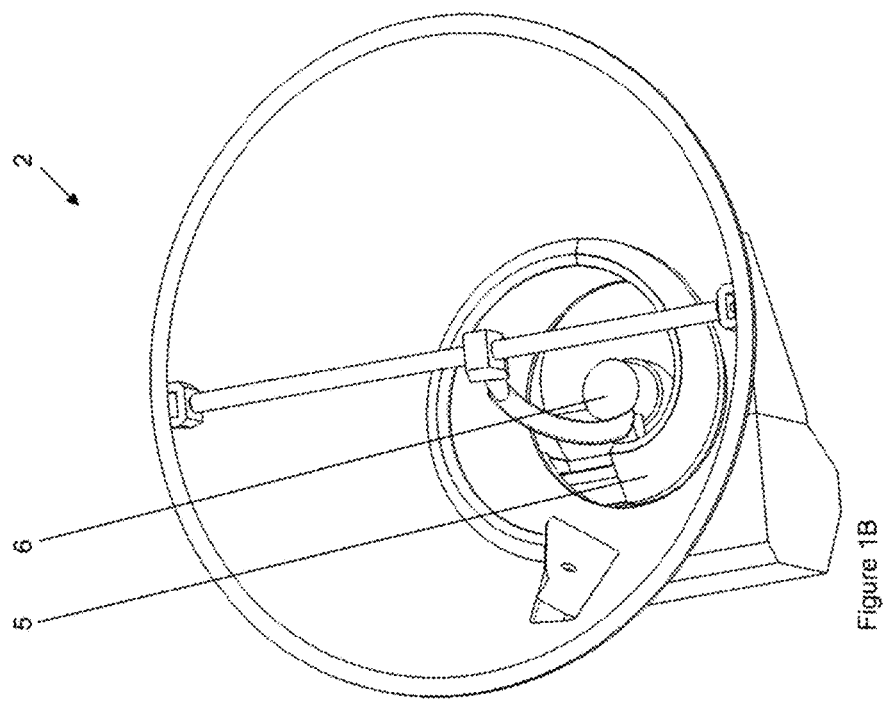
FIGS. 1A and 1B show an example of a hopper.

FIGS. 1A and B show a hopper that is preferably connected to the inventive system. A meat trolley can be utilized to insert the mass of food product into the hopper 3, for example, by a separate lifting unit positioned alongside the inventive system. It is also possible to integrate a lifting unit in the inventive system. In the present design, the hopper is cone-shaped. To avoid that meat sticks to the hopper sidewall and to prevent bridge-forming, the hopper wall is preferably under an angle of approximately 30° relative to its center axis. The outlet of the hopper is flow-wise connected to the inlet of a feed pump. Even though, some food mass can be fed to the inlet of the pump by gravity, most food mass needs to be transported to the inlet of the feed pump with a feeder 4, for example a rotating feeder 4, which comprises in the present case a feeder blade 5 that is, in the present case, spiral-shaped. Smearing, which result in damage of the product structure, between the feeder blade 5 and hopper sidewall can be reduced/prevented by reducing the gap between the outer circumference of the feeder blade and the inner circumference of the hopper sidewall. The cross section of the feeder blade can be constant over its length, as can be seen in FIG. 1a, but in order to improve the transport of the food mass towards the outlet of hopper and/or the filling of the pump cavities of a positive displacement pump, the cross section of the feeder blade preferable varies with its length, more preferably the cross section decreases towards the exit of the hopper, as depicted for example in FIG. 1B, and even more preferably the diameter of the spiral decreases towards the exit of the hopper (compare FIGS. 1A and 1B). Preferable, a scraper 8 is attached to one end of the feeder blade 5. The feeder blade 5 feeds the food mass towards the exit of the hopper.

Figure 1B:
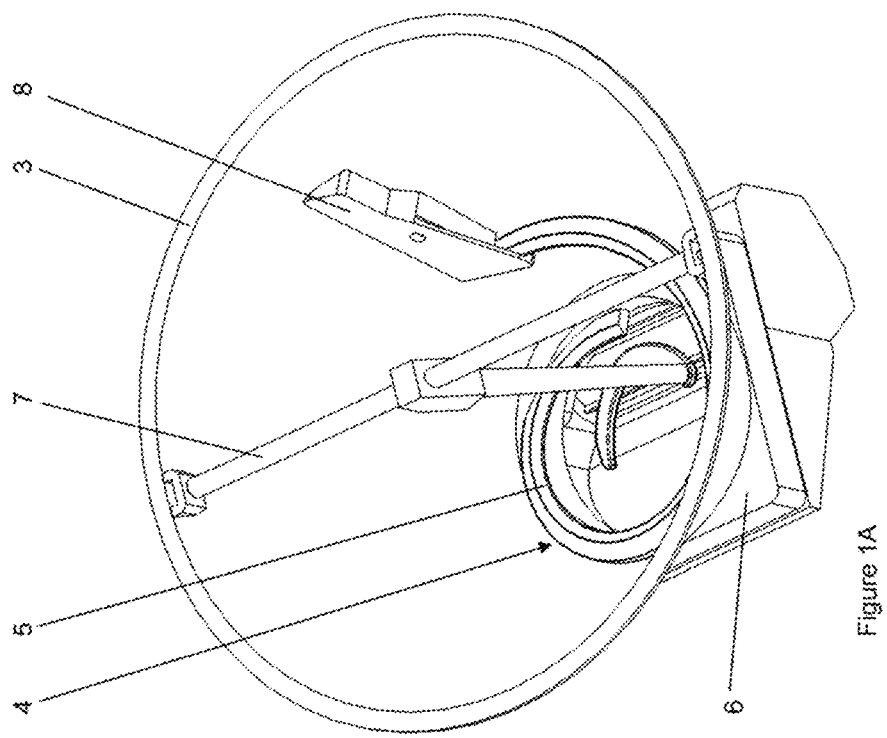

The rotating feeder 4 can be, for example, driven in two ways. FIG. 1A shows a first option to drive the rotating feeder. The feeder blade 4 is connected to a cylindrical ring element which forms together with a ring gear a bayonet connection. The ring gear is driven by a drive unit 6 and is preferably part of the hopper. For cleaning purposes the rotating feeder 4 can be removed from the hopper by rotating the feeder manually out of the bayonet connection. FIG. 1B shows a second way to drive the rotating feeder with drive mechanism 6 from the center line of the hopper where the drive mechanism is positioned below the pump. To avoid that the food mass will spin around when the feeder rotates, the hopper is preferably provided with a feeder 7 which is preferably not moving. Particularly at its lower end, the hopper is preferable provided with one or more fins at the inner circumference of the hopper. For cleaning purposes, the hopper is preferably pivotally mounted. Cleaning can be further facilitated by making the hopper out of 2 parts wherein both parts are independently pivotable. Preferably, the hopper can be connected to a vacuum source, preferably at its lower end. Preferably, the hopper is subjected to a vacuum via the feed pump. Preferably, the outlet area of the hopper is relatively large, the distance between hopper and the pump is minimized and/or the internal walls are smooth, for example to reduce shear forces on the food mass.

The rotating feeder preferably provides just enough food mass so that each pump chamber is just filled, but the food mass is preferably not compressed. When processing for example meat, during compression the meat juices will be released from the meat which results in a damaged meat structure. By means of vacuum in the pump, transport of mass from the hopper to the pump can be improved. As a result the speed of the rotating feeder can be reduced and compression on the mass will be reduced. Preferably, the drive of the rotating feeder in the hopper and the drive of the pump are separated them from each other. An additional advantage of a short distance between the hopper and the pump is that after production less food mass will remain in the system Reference is now made to FIGS. 2A, 2B, and 2C. According to the present invention, the pump in the inventive system is preferably a positive displacement pump with preferably equally spaced, more preferably radially displaceable vanes 15. Each vane extends axially, essentially over the entire length of the pump. The vanes are driven by a rotor 17, whose center axis extends parallel to the center axis of a mould drum as can be seen from the figure in the upper right hand corner. The pump preferably comprises several zones: preferably a vacuum zone 20, a transport zone 21, a pump inlet 22, a compression zone 23 and a pump outlet 24. The direction of rotation of rotor 17 is here counter-clockwise. The pump comprises a multitude of pump chambers 16, each pump chamber being confined by two vanes 15. Preferably, each chamber is as large as possible. This preferred embodiment results in less damage at the structure of the meat pieces. A large pump chamber can be achieved by using a rotor 17 with a long axial extension, a relatively small diameter, a reduced number of vanes and/or a housing 18 with a large inner diameter. Preferably, the vanes do not deform during the pumping of the food mass. Another way to create a large pump chamber is using a rotor 17 and a reduced number of vanes 15. However, the reduction of the number of vanes is limited by the pressure differential that needs to be achieved by the feed pump and/or in case a vacuum zone is needed.

Preferably, the rotor is, not too heavy and is easily removed and to replace, for example in case the pump needs to be cleaned. Preferably the rotor is made out of plastic material, more preferable out of a reinforced plastic material. To reduce friction of the food mass, the surfaces of the vanes and/or the inner wall of the housing are preferably smooth and more preferably polished.

For cleaning purposes the mass supply system 2 and/or the divider 9 can be moved, preferably shoved away from the mould member. In a more sophisticated embodiment of the mass supply system and/or pump a Clean-in-place-system (CIP system) to clean the interior can be used. Disassembly and manually cleaning of parts like end caps 19, vanes 15, rotor 17 and cam 25 will not be necessary anymore which decrease the cleaning time and prevent risks which occur when working manually with chemical cleaning agents.

The outlet of the pump is preferably as large as possible and extends, more preferably essentially over the entire axial length of, the rotor and/or the vanes.

In an inventive or a preferred embodiment of the present invention, the pump can be directly or indirectly connected to a vacuum source, for example to improve the filling of the chambers of the pump, to degas the food mass, to increase the density of the food mass and/or to achieve a food mass flow with reduced pulsation. Pulsation of the pump may result in considerable weight differences of the products formed in one row, i.e. formed simultaneously. The vacuum zone 20 is preferably positioned between the outlet of the feed pump and the transport zone of the pump, preferably relatively close to the inlet of the feed pump. The connection to the vacuum source is preferably provided in the housing of the pump and more preferable just before the pump chamber opens towards the transport zone. Further, the position of the channels is such that an open contact between transport zone and vacuum zone must be prevented to prevent mass flow back in the vacuum zone and flowing from there on directly into the vacuum source. The feed pump may comprise one or two end caps 19 at each of its axial ends. Each end cap is preferably connected to the housing and/or is preferably part of the housing and can be provided with channels which are in contact with the vacuum source and the pump chamber to retract the air out of the pump chamber. The small gaps between the moving vanes and the slots in the rotor, which guide the vanes, can also be used to retract air out of the pump chamber. Flow of food mass to the vacuum pump can also be prevented by increasing the number of vanes in combination with a suitable vacuum channel position however the volume of the pump chamber will be decreased A reduced pressure in the pump chamber can also be achieved by a membrane that faces on one side the chamber of the feed pump and on the opposite side a vacuum source or mechanical movement means.

Preferably the volume of each pumping chamber 16 changes during its rotation within the inner diameter of the feed pump. In the transport zone 21, where the mass flows from the hopper into the feed pump chamber, the feed pump chamber has preferably its largest volume. The volume than preferable decreases until the outlet of the feed pump and subsequently increases again. During the increase of the volume, preferably the pressure is reduced in the respective chamber.

Preferably, the pump comprises means to prevent that the meat gets stuck between the vanes and the housing of the feed pump, which can result in smearing and a damaged product structure. Alternatively or additionally, the design of the inlet 22 of the feed pump should be such that the mass flows freely, without interruption from the transport zone to the compression zone. The pressure loss should be minimized. Preferably, there is no sharp edge so that the mass flows gentle through the pump.

The compression of the food mass in the compression zone should be as low as possible. To prevent backflow of food mass during pressurizing of the food mass, there is preferably only a small clearance between the tips of the vanes and the inner diameter of the feed pump and/or the tip of the vanes touch the inner diameter of the pump, particularly in the compression zone 23. Preferably, the size of the clearance depends on the size of the pieces of food mass to be processed. The size of the clearance is also designed according to the desired pressure on the food mass during the forming process and/or the size of the particles of the food mass. When the clearance is large and the food mass is for example thin pre-cut meat under with a relatively high temperature, internal leak in the feed pump can occur whereby the desired pressure on the food mass will not be achieved. In case the tip of the vane is in contact with the inner wall of the housing both are preferably wear resistant. The inner sidewall of the housing is preferably provided with a hardened metal layer. The choice of materials of vanes and housing is preferably such that even dry running during the startup phase will be no problem with respect to wear and tear.

The vanes are preferably radially displaceable, more preferable slideable, beared in the feed pump, for example each vane slidable in a slot in the rotor of the feed pump. During rotation of the rotor each vane moves in and out of the respective slot in the rotor. FIG. 2 shows a first embodiment of a positive displacement pump with vanes 15 wherein each vane moves in and out a slot of the rotor 17, here driven by a stationary cam 25 inside the pump housing, respectively. The inner end of each vane 15 is in contact with the surface of the cam 25 and this result in the radially movement of the vanes within the pump. The person skilled in the art understands that the vanes can also be spring loaded and pressed against the inner circumference of the housing of the feed pump.

FIGS. 3A and 3B show a second embodiment of the positive displacement pump, here with vanes 15. The radial position of the vanes is here determined by cam tracks 26 which are positioned preferably in both end caps 19 of the pump housing. The vanes are, at their axial ends, provided with small cams which are guided in these cam tracks 26, respectively. FIG. 3A shows a guiding of the vanes in the end caps and/or in the axial ends of housing 18. FIG. 3B shows the use of insert 27 in the housing which can be advantageous in manufacturing the housing. It is even more preferred to use two inserts; one for the vacuum zone and one for the compression zone. One or more wear and tear parts of the housing which will be in contact with the moving vanes are preferably provided as an insert. This will extend the lifetime of the most complex part of the food mass supply system, namely the housing of the feed pump. In both FIG. 3A and FIG. 3B of these embodiments no vacuum zone is used. By changing the housing of the pump and/or insert and changing the cam tracks both embodiments can also be provided with a vacuum zone similar as described in FIGS. 2A-2C.

Figure 4A:
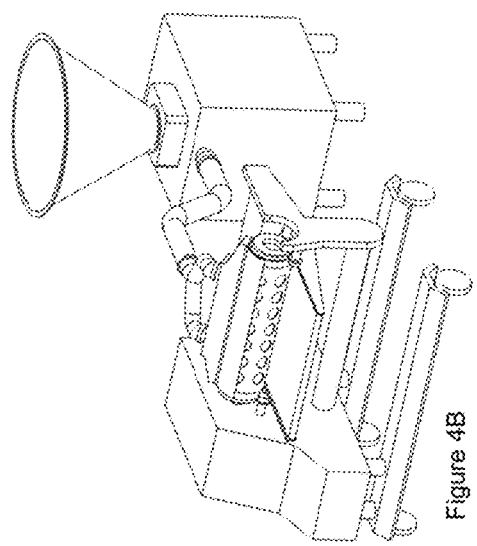
FIGS. 4A, 4B, 4C, and 4D show the hopper and the mould drum.
Figure 4B:
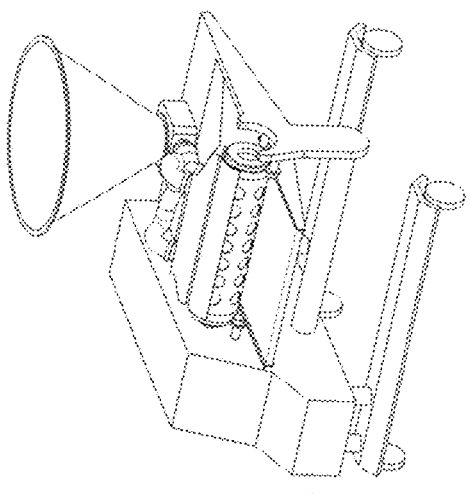

The mass supply system can be a separate unit which is connected to a forming apparatus or it can be integrated into the forming apparatus. FIGS. 4A shows a mass supply system 2 which is a separate unit which will be connected to mass transfer means 10 and a divider 9 to a forming apparatus 1 with a mould drum 28. The mass transfer means in FIG. 4A is a tube with a relatively large cross-section. The food mass flows from the tube 10 into a divider 9, which distributes the food mass over the axial length of the mould drum 28. The food mass transfer and/or distribution causes friction between the food mass and the inner wall of the transfer means and/or the divider, which results in a pressure loss of the food mass. This pressure loss can be overcome by increasing the pump pressure on the food mass. However, this will lead to higher shear forces on the food mass which will result in damage of the structure of the food mass. In FIG. 4B the transfer means 10 is split in two tube-branches for pre-distribution of mass to reduce the volume of the divider and/or to improve uniformity of the food mass distribution over the axial length of the mould drum.

Figure 4C:
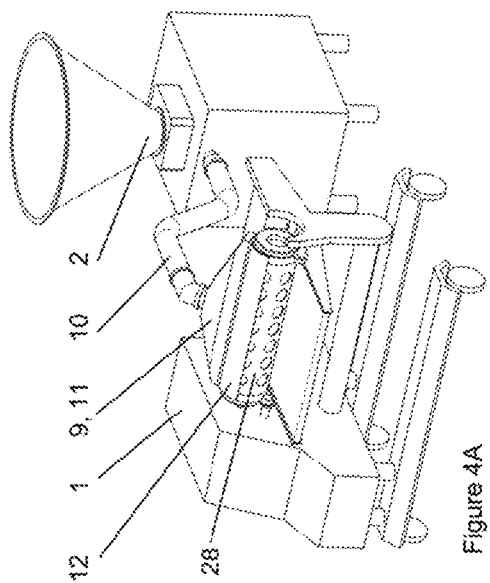
Figure 4D:
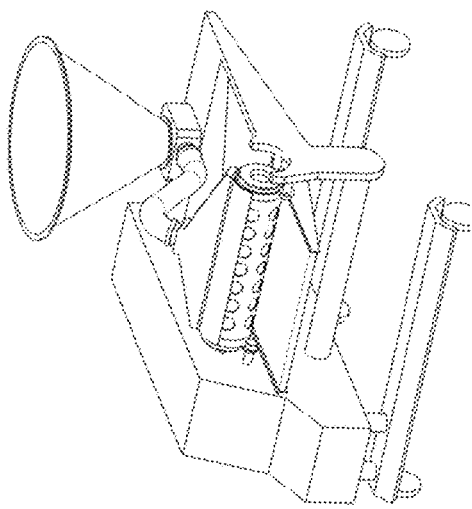

FIG. 4C and FIG. 4D shows preferred embodiments of the present invention. In comparison to the embodiments according to FIG. 4A and FIG. 4B, the mass supply system is integrated in the forming apparatus. By minimizing the distance between feed pump and the mould drum, the shear forces on the food mass and thus the pressure drop will be reduced. In FIG. 4C, the feed pump of the mass supply system is connected with a tube/pipe to the divider 9 which is provided with an internal feed channel 11 that will distribute the food mass across the axial length of the drum. The divider comprises at its inlet side a slightly sloped sidewall to distribute the food mass across the axial length of the mould member. The divider is preferably connected to a seal 12 which is in contact with the surface of the mould drum to reduce/prevent leakage of food mass between the divider and the mould drum. The seal can extend upstream and/or downstream from the divider. The divider and seal can be made as a single piece. The maximal diameter of the supply pipe is restricted mainly due to handling of the pipe during cleaning and due to rest food mass after production. When using a long moulding drum with a length of for example 1000 mm, the pump has to be positioned relatively far from the mould drum to assure an equal distribution of food mass in the feed channel across the axial length of the mould drum. This is important to prevent weight variations of the formed products in one row of cavities in the mould drum. FIG. 4d shows a second embodiment wherein the dimension of the divider 9 can be reduced by making a Y-shaped split in transport means 10. This results in an improved food mass distribution over the axial length of the mould drum and a less voluminous divider with less rest mass after production.

In case pressure peaks on the mass occur between the mass supply system and the mould member, for example as a result of pulsation, with result that there will be weight difference of formed products in longitudinal direction of the mould member. These pressure peaks can be reduced and/or avoided by a pressure equalization system.

This pressure equalization system can be an accumulator which will be in direct contact with food mass and which can be positioned between the mass supply system 2 and divider 9 or can be part of mass transport means 10, can be part of divider 9 and/or can be positioned between divider and mould member. Such an accumulator will for example be provided with a piston which piston is subject to the pressure of the mass. When the pressure on the mass increases the accumulator will accumulate mass and when the pressure on the mass decreases the accumulator will provide mass to the flow of mass between mass supply system and mould member to equalize the pressure on the mass.

In another embodiment or additionally a flexible element with a certain length can be positioned between the mass supply system and the divider or can be part of the mass transport means 10, can be part of divider 9, can be positioned between divider and mould member or the divider is in it entirely a flexible element.

This flexible element must be flexible perpendicular to the direction wherein the mass flows to equalize the pressure. When the pressure on the mass increase this flexible element will expand with result that the pressure will decrease. When the pressure on the mass will decrease below a certain value the flexible element will return to its original shape by the spring action of the material of the flexible element. When the mass transport means between pump and mould member is a circular shaped tube, a plastic hose suitable for use in the food industry can be used. How longer this hose, how more effective it will be.

Other ways to achieve a uniform pressure distribution over the axial length of the mould member can be achieved by the combination of (pressure) sensors, a dynamic drive system, control and software and will be described later in this document.

Figure 5C:
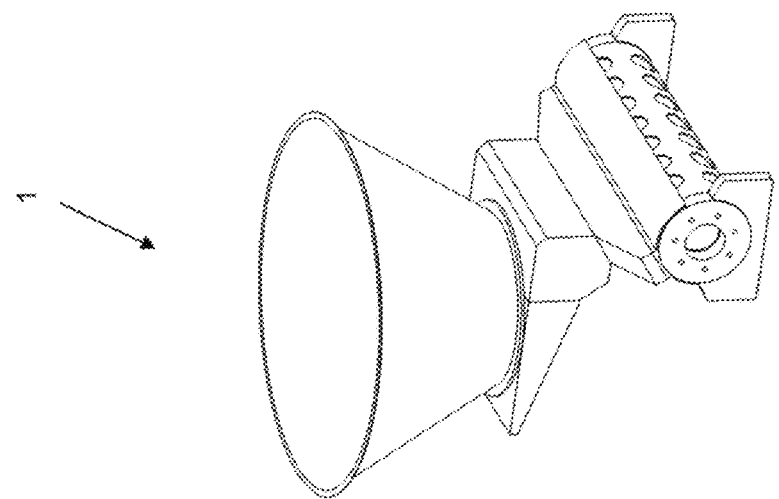
FIGS. 5A, 5B, and 5C show the distribution of the food mass over the axial length of the mould drum.
Figure 5B:
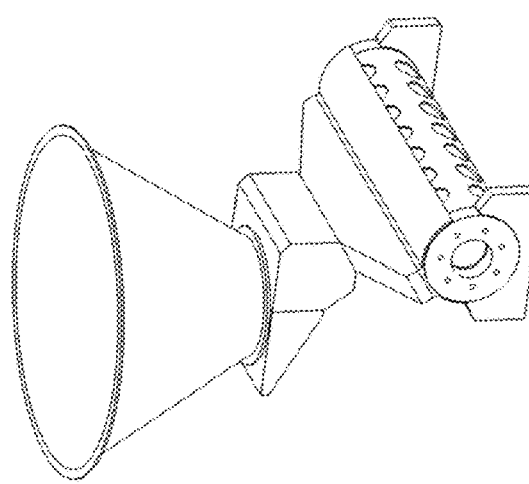
Figure 5A:
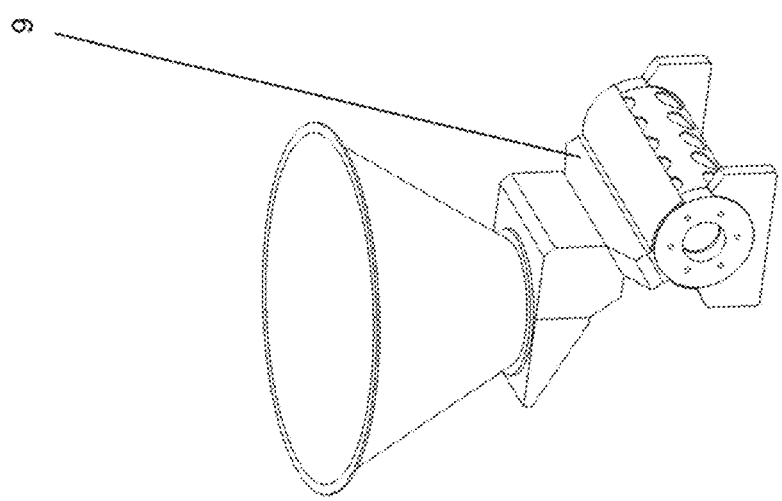

FIGS. 5A-5C show an improved distribution of the food mass over the axial length of the drum. The outlet of the pump has preferably a rectangular cross section. Food processing lines are manly used with axial length of net 400 mm, 600 mm and 1000 mm. A pump with an outlet length of, for example, 400 mm can be used in combination with a divider 9 for a mould drum with an axial length of 600 mm or even 1000 mm. FIG. 5A shows a pump with, for example 400 mm axial length and a mould drum with for example, 600 mm axial length. FIG. 5B shows a pump with for example 400 mm axial length and a mould drum with, for example, 1000 mm axial length. The divider according to FIG. 5B is larger than the divider in FIG. 5A, to improve the food mass distribution over the axial length of the mould drum.

FIG. 5C shows a pump with, for example, 600 mm axial length and a mould drum with, for example, 1000 mm axial length. The divider 9 is smaller than the divider in the example according to FIG. 5B.

The divider in the example according to FIG. 6A has an angle of 8° and in FIG. 6B an angle of 20°. The choice of the angle depends mainly on the kind of food mass which will be used. Advantage of a small angle is less rest food mass after production. Another advantage of a less voluminous divider and/or a more stable formed food product. In case the production speed of the forming apparatus is low the food mass will be transported slowly through the divider. During that movement heat exchange will occur between the mass and the relatively warm housing (preferably stainless steel) of the divider. Especially when the pressure on the food mass is high the food mass at both outer ends of the divider will get somewhat softer which can result in weight differences of the formed products over the axial length of the mould drum. FIGS. 6C and 6D show dividers with different cross sections. Preferably the less voluminous divider of FIG. 6D will be used.

FIG. 7A-7B shows a forming apparatus 1 with a mould drum with an axial length of, for example, 600 mm and a pump with an outlet with here 570 mm axial length, which covers the most outer product cavities in the mould drum to achieve an improved distribution of meat over the width of the mould drum, i.e. the axial length of the mould drum is essentially equal to the axial length of the outlet of the feed pump and/or the axial length of the rotor of the feed pump. In this case a divider is not needed. In a food processing line with 400 mm width, the axial length of the outlet of the feed pump is for example 370 mm. For width larger than this, preferably dividers are used.

FIGS. 8A1, 8A2, 8A3, 8A4, 8B1, 8B2, 8C1, 8C2, 9A, 9B, 9C, 9D, 10A1, 10A2, 10B1, and 10B2 show different embodiments of the described mass supply system 2 connected to a mould drum and using a seal 12 partially around the circumference of the mould drum. The seal may extend upstream and downstream from the feed channel 11. The seal reduces the food mass leakage between the mass supply system and the mould drum. However, this seal only closes the cavity during filling and does not comprise a holding part, which holds the filling pressure or a pressure above ambient pressure after the filling of the cavity is completed. Immediately after the filling is completed, the filled cavity is at least partially exposed to ambient pressure. The seal 12 and the feed channel 11 can be provided as one single part. The mass supply system is in the example according to FIG. 8A1-8C2, positioned above the horizontal middle axis of the mould drum to discharge, for example, even long food products properly. FIGS. 8A1-8A4 show a mould drum with a, for example. 150 mm long product cavity, which will be filled with food mass. In FIGS. 8B1-B2 the cavity is, for example, 100 mm long and in FIG. 8c, the product cavity is, for example, 50 mm long. FIGS. 8C1-C2 shows that, in case, the drum rotates counter-clockwise from its filling position to its discharge position, the short formed product is for a relative long period not supported by seal 12. Preferably, the seal 12 up- and/or downstream from the filling zone is made as short as possible, more preferably its length downstream from the filling zone is only as long as the extension of the cavity in circumferential direction of the drum, i.e. the cavity is reopened right after its filling is completed. Preferably no holding of the filling pressure in the cavity takes palace after the filling is completed.

Figure 9C:
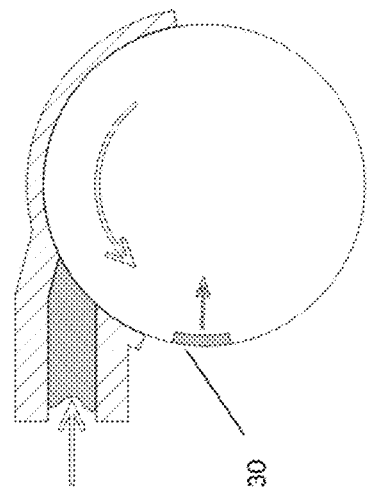
FIGS. 9A, 9B, 9C, 9D, and 9E show the system with and without holding means.
Figure 9D:
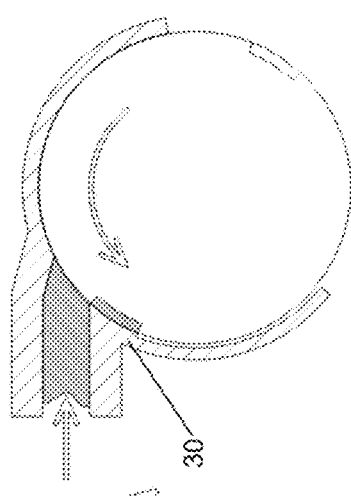
Figure 9B:
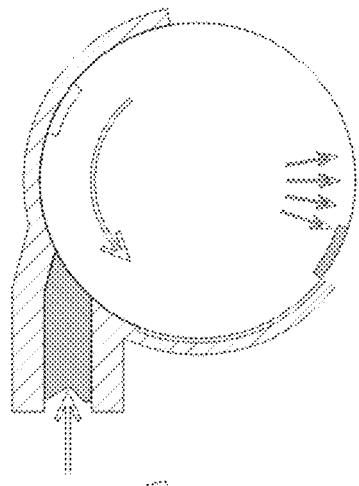
Figure 9E:
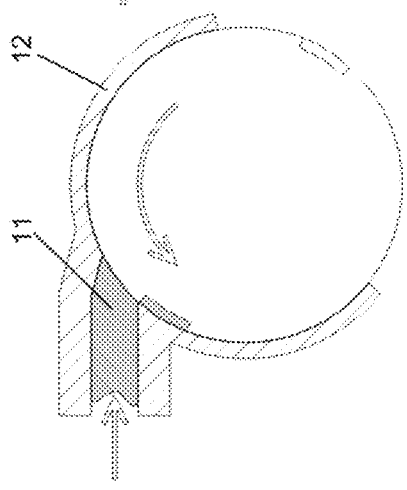
Figure 9A:
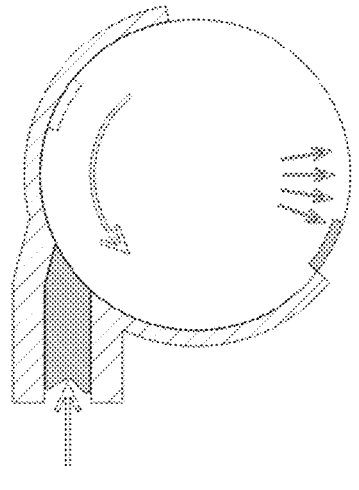

To prevent that the formed product will be released too early from the mould cavity, the seal 12 can be extended further downstream (as shown in FIGS. 9A-9E). FIG. 9A shows the seal in close contact with the drum till the discharge position. FIG. 9B shows the seal with a closing part 30 and an extended part further downstream which is, however, provided with a substantial gap between the surface of the mould drum, so that the cavities are exposed to ambient pressure after they have been filled FIG. 9C shows an embodiment which uses vacuum to keep the formed product in its mould cavity.

FIGS. 10A1, 10A2, 10B1, and 10B2 show a mass supply system 2 whose center axis is positioned below the horizontal middle-axis of the mould drum. The system comprises a seal 12 around the drum provided with closing part 30 to close the mould cavity. A uniform solution for all lengths of formed products can be created by adjusting feed channel 11. FIG. 10A1-10A2 show a feed channel 11 for longer products and FIG. 10B1-10B2 a feed channel for shorter products.

Preferably, the mass supply system provides a uniform pressure distribution over the entire axial length of the mould drum.

Preferably, the mass supply system comprises drive means 6 for the rotating feeder, drive unit 31 for the feed pump and drive unit 32 for the mould drum. These drive means can be hydraulic means but electric motor means are preferred for one or more drive means of the inventive system. The drive for the mould drum is preferably an AC motor with frequency control or a servo driven system. An AC motor with frequency control will be suitable in most applications. A resolver, encoder, encoder-less (software will determine rotational displacement motor) or other rotational tracking means are preferably provided so that the rotational displacement of the used motor can be evaluated in a control unit for detection current angular position of the drum and/or for controlling the speed of the drum.

A program preferably controls the motor for a controlled start up/stop of the mould drum, for the desired speed during production and/or for control the moment of discharge of formed products out of the mould cavities.

According to one embodiment the drive of the rotating feeder is fixedly coupled (mechanically or via software) to the drive of the feed pump. In a preferred embodiment the drive of the feeder is separated from the drive of the feed pump. The drive of the rotating feeder can be an AC motor with frequency control or a servo driven system. An AC motor with frequency control will be suitable in most applications. A resolver, encoder, encoder-less (software mil determine rotational displacement motor) or other rotational tracking means should be provided so that the rotational displacement of the used motor can be evaluated. A control unit preferably controls the speed of the rotating feeder. A program preferably controls the motor for a controlled start up/stop of the rotating feeder and/or for desired speed of the rotating feeder.

The motor means which drives the feed pump is preferably a stepper motor, a servo motor, but more preferably an AC motor with frequency control. A resolver, encoder, encoder-less (software will determine rotational displacement motor) or other rotational tracking means are preferable provided to improve the operation of the feed pump. The rotational displacement of the used motor is preferably evaluated in a control unit. A program will control the drive for the motor for a controlled start up/stop of the rotor and/or for the desired operation of the feed pump. Preferably, the feed pump is pressure regulated and/or the motor is torque controlled. FIG. 11 shows a first embodiment of a pressure controlled feed pump. For example an operator sets a value for the desired pressure (filling pressure) for the food mass at the outlet of the feed pump and/or in the vicinity of the drum, the speed of the mould drum and/or the speed of the rotating feeder and/or the operating time of the rotating feeder. A sensor 34 which measures the filling pressure of the food mass in the feed channel 11 is here placed preferably close to the mould drum. The mould drum rotates here in a counterclockwise direction with a preferably constant speed. When the filling pressure on the food mass, measured with the sensor 34, drops below the set value, the rotating feeder will rotate via drive means 6 and the drive unit 31 for the food pump will also rotate and deliver food mass. Consequently, the measured filling pressure value increases. As soon as the measured filling pressure reaches the set value, the control unit will stop further rotation of the feed pump and/or the rotating feeder. The motor of the feed pump in this pressure regulated system is preferably torque controlled and will maintain the filling pressure of the food mass. Especially when processing fibrous whole muscle food mass it is preferably prevented that mass flows back into feed channel 11 which result in partially filled cavities. Therefore the feeding pressure of the food mass is preferably maintained until the cavity to be filled has passed the feed channel completely.

Figure 12B:
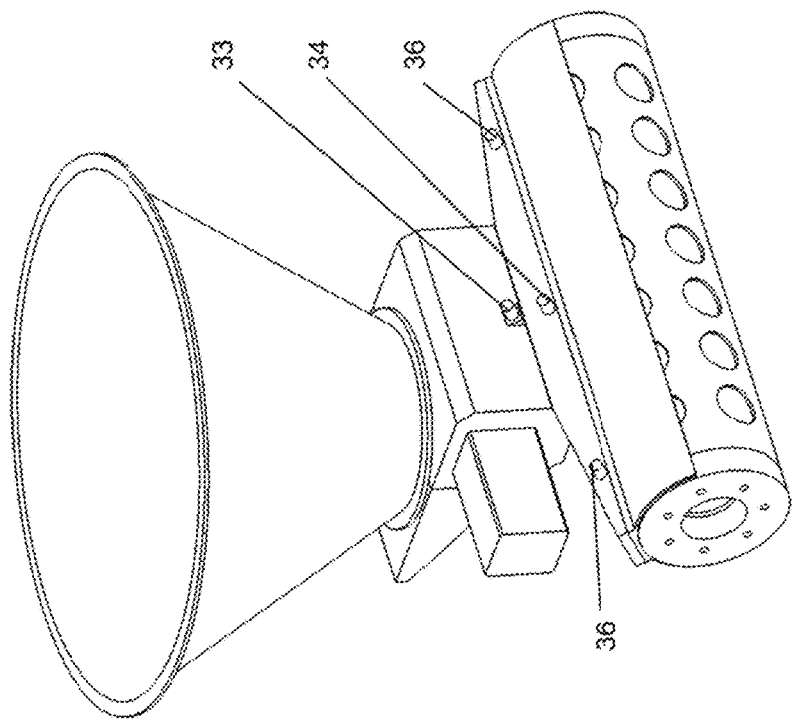
Figure 12A:
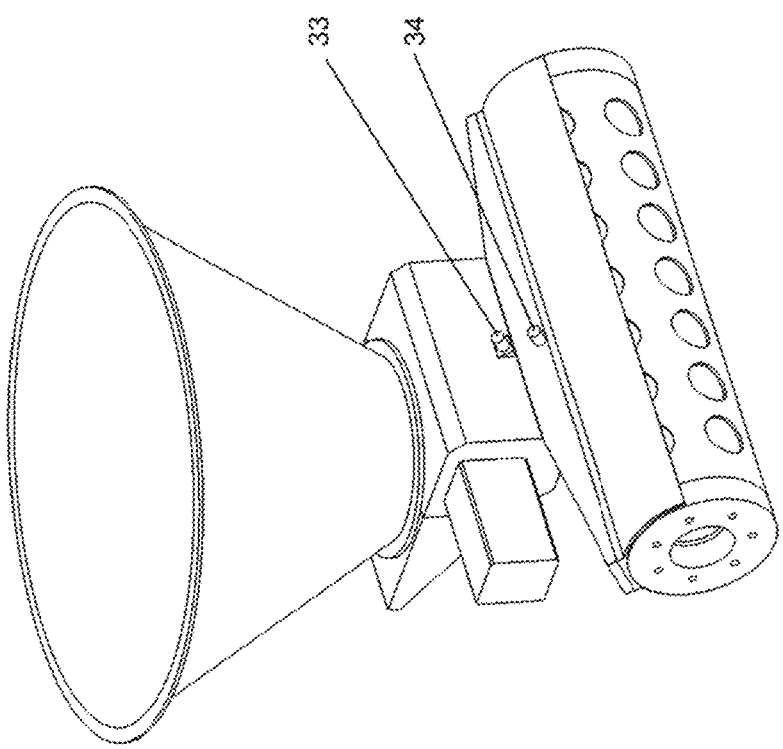

In the embodiment according to FIG. 12A and in comparison to the embodiment in FIG. 11, an additional pressure sensor 33 in the outlet of the feed pump has been provided which measures the pressure at the outlet of the feed pump. This allows to control the feed pump more smoothly resulting in less pressure peaks and a more uniform pressure distribution over the axial length of the mould drum. Preferably the cavities are filled at least essentially continuously. Preferably, the system is PID controlled.

FIG. 12B shows an even more advanced system with four pressure sensors. Reference is made to the disclosure regarding FIG. 11. Pressure sensor 36 will measure the efficiency of the divider. For most food masses the distribution across the axial length of the mould drum will be symmetrical and one sensor 36 will be sufficient. A certain difference between the pressure 34 and 36 is acceptable. This acceptable pressure difference is preferably a set parameter. When the pressure difference between 34 and 36 exceeds the set value and thus the weight and/or appearance of the formed product across the width of the mould member will differ more than acceptable the control system will response. One option is that the drum speed will be reduced with the result that the filling time for filling the mould cavities will be increased which can result in a smaller pressure difference between 34 and 36 or which allows even at a lower filling pressure a complete filling of the cavities. It is even possible to stop or almost stop the rotation of the drum during filling the cavities and increase the speed after filling of the cavities in the respective row is completed until the next row of cavities has to be filled Another option is to allow that pressure 34 will be increased above its set value. Pressure 36 will be increased too with result that all the formed products will at least have a minimum weight. Disadvantage is too much give away of product. These steps to improve the filling of the mould cavities can be done manually by, for example, changing parameters on the operating panel but preferably it is carried out automatically.

FIGS. 13A-13C shows the two most important parameters 'a' and 'h' in the divider design. Preferably 'a' and 'h' should be small but when the weight of the formed product in the center of the mould member and the outer ends of the mould member will differ too much the weight variation has to be improved by a divider with a greater angle 'a' and/or a larger height 'h' see FIG. 13 which shows two mass supply systems each with a different divider. Preferably, 'a' is between 10°-30° and/or h 20-40 mm. The larger the mass flow through the divider, the larger the divider angle shall be designed. In case of high mass flow, a divider with two or more inlets as shown in FIGS. 4B and 4D is preferred.

FIGS. 14A and 14B show another embodiment of the mass supply system 2 using 6 pressure sensors. Reference is made to the disclosure regarding FIGS. 11-13. Pressure sensor 35 measures the pressure of the food mass at the outlet of the feed pump. As described earlier, only one sensor 36 but also one sensor 35 will for most applications be sufficient. A certain difference between the pressure 33 and 35 is acceptable. This acceptable pressure difference can be a set parameter. When the pressure difference between 33 and 35 exceeds the set value the control system will response. There are, for example, the following options; when using vacuum to draw food mass into the pump chamber of the feed pump the vacuum level is preferably increased to a higher value. Alternatively or additionally, the speed and/or timing of the rotating feeder is preferably adjusted.

To prevent that partly filled products will be discharged from the mould member two options are preferred, alone or in combination. In a first solution the drum will be reduced in its speed of rotation or stopped with its mould cavity 42 located underneath feed channel 11. Only in case the actual pressure 34 and/or 36 are equal or substantially equal to the set point of the filling pressure the drum will accelerate or rotate further. In a second solution the drum will rotate continuously. Only when in a certain row of products the actual pressure 34 and/or 36 are equal or substantially equal to the set point of the filling pressure this row of products will be discharged from the mould drum in the discharge position.

Sensor 33 and/or 35 can also be used to check if the food mass level in the hopper is too low. When the rotor of the feed pump is rotated by a certain angle of rotation and pressure 33 does not increase or only slightly increase it can be assumed that the food mass level in the hopper is too low. Alternatively or additionally, a level sensor to detect the filling-level in the hopper is used.

Figure 15B:
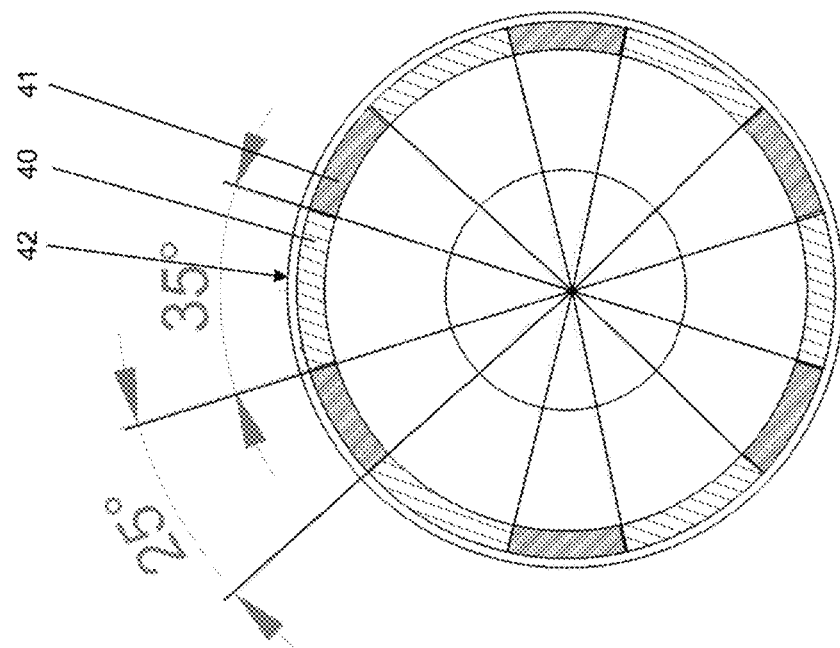
Figure 15A:
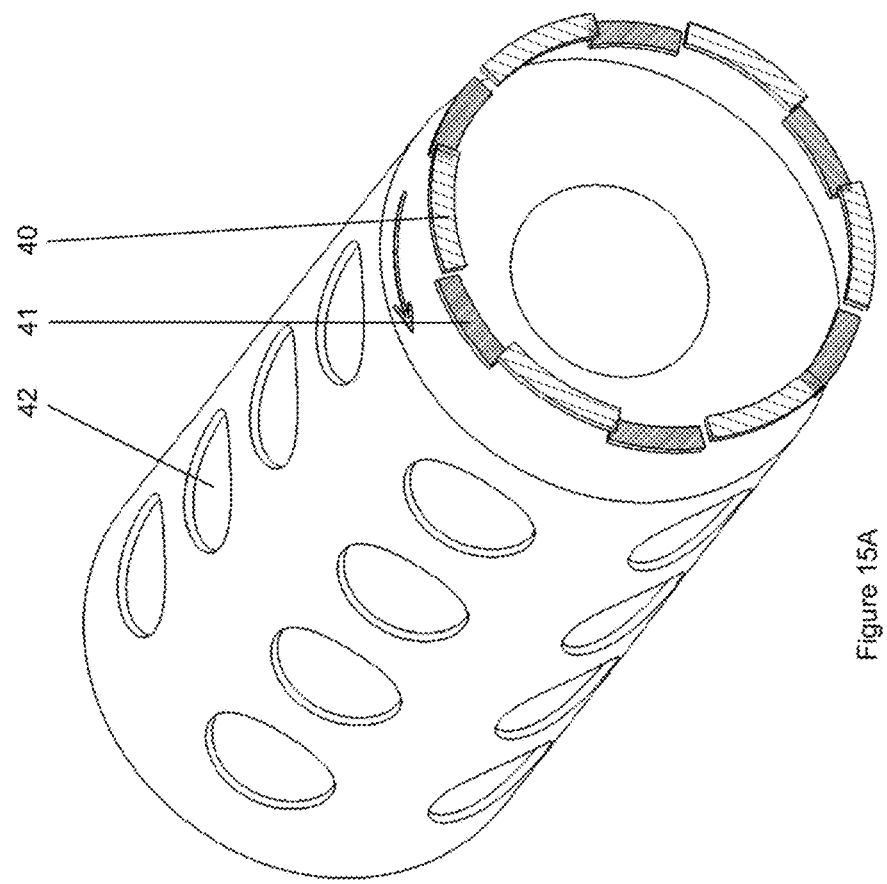

Preferably the feed pump is used to potion the food mass into portions needed to fill one cavity or one row of cavities. Preferably only this portion of the food mass will be pressed in the direction of the food mass, while the cavity/cavities to be filled are in the vicinity of the outlet of feed channel 11. Essential for this embodiment is a synchronization of the rotation of the feed pump with the rotation of the mould drum. FIG. 15 shows a side view of the drum where segments 40 in the circumference of the drum are projected to indicate the position of rows of mould cavities 42 and where segments 41 are projected to indicate where no rows of mould cavities are located in the circumference of the drum. Thus, a control unit knows when a cavity to be filled is in the vicinity of the feed channel. The person skilled in art understands, that other means to determine the angular position of the cavities.

The portioning mode preferably comprises an accurate and/or dynamic drive system with preferably short response times. Therefore the drive for the rotor of the feed pump, preferably a positive displacement pump, is preferably servo driven. Preferably all drive units (vane pump, rotating feeder and drum), but at least the drive of the mould drum are provided with a resolver, encoder, encoder-less (software will determine rotational displacement motor) or other rotational tracking means. The more pulses the preferably used encoder generates the more accurate the system will be. The rotational displacement of the used motors are, for example, evaluated in a control unit for detection of the current rotational position of the mould drum and the rotor of the feed pump and are utilized for the control the rotation of the drum and/or the rotor of the feed pump.

In the control unit the main set parameters to control the portioning and filling process are, for example, the volume of each pump chamber of the positive displacement pump, the filling pressure of the food mass and mould drum parameters like number of cavities in one row, volume of each mould cavity, length of each mould cavity, annular distance between two mould cavities in the mould drum and/or rotational speed of the mould.

While the feed pump in the portioning mode works with theoretically determined parameters it is preferable to create a closed loop control which allows correction of the supply of mass when necessary. Therefore the pressure sensors 33, 35 and 36 are preferably used to check if the pressure during portioning across the width of the pump and across the width of the drum is still sufficient. If this not the case, the control unit can interrupt and/or correct for example, the vacuum level, the speed of the rotating feeder, running time of the rotating feeder, the rotation of the rotor of the feed pump and/or the rotation of the mould drum.

The control unit knows essentially at every point in time in which rotational position the cavities in the drum are located, knows the volume of the single cavities, knows the position of the rotor of the positive displacement pump and thus the position of the individual pump chambers and will be able to calculate and control the angle of rotation, start moment, speed profile and/or stop moment of the rotor of the vane pump and accordingly, if needed the start moment, speed profile and stop moment of the rotating feeder. Based on the above information, it preferably also controls the rotation of the mould drum. However it is also possible that the mould drum rotates at a constant speed.

Not every food mass has the same flow characteristics. When processing a poorly flowing food mass, the rotation of the feed pump has to be started earlier compared to processing an easy flowing food mass. Also the compressibility of food mass can be different which also result in a different operating time of the feed pump. The same food mass with different temperatures results in a different flow characteristic. Different food masses also result in different feed pump pressures even if the filling pressure is the same. Different food masses require different filling times, within a high speed production line actual filling times will probably be shorter than required. Solution can be an adjusted speed profile for the drum; relatively slow speed during filling, relatively high speed between succeeding rows of cavities.

In FIG. 16A mould cavities 42 are overlapping feed channel 11. In the pressure controlled system already discussed in this document pressure 34 will drop below its set point and the pump will deliver mass to compensate this pressure drop. While the mass will have certain inertia of movement the mould cavity will be further filled with a pressure somewhat below the set point which can result in unevenly filling of the mould cavity in the direction of rotation of the drum.

The inventive portioning system knows exactly when filling of the mould cavity will be started. The pump is preferably already activated before the actual pressure drop is detected. The pump can rotate as long as the mould cavity overlaps the feed channel and will deliver a pre-calculated volume of mass. In this way the mould cavity can be filled with an even pressure over its total length in the direction of rotation of the drum.

In FIG. 16B no mould cavities overlap the feed channel 11. In this segment 41 of the circumference of the mould drum between two succeeding rows of mould cavities, it is possible to relax the food mass by reducing the pressure on the food mass. This relaxation can be done, for example, by increasing the volume between the pump and the mould drum and/or by rotating the rotor of the positive displacement pump in the reversed direction. This relaxation is advantageous with respect to remain the structure of the mass while it will be compressed during a shorter time period and/or to prevent leakage. The relaxation is preferably carried out while the filling of the cavity is still ongoing and/or after it has been completed.

To operate the portioning system properly under all above mentioned conditions the drive system will preferably have an intelligent control which is preferably self-learning. For example measurements of all the actual pressures pressure drops versus time and versus succeeding rows of mould cavities in the drum, versus the position of the drum, rotor of the vane pump and the rotating feeder can be evaluated to indicate the flow characteristic of the used mass. Finer adjustments in driving the vane pump, rotating feeder and drum will be made based on the evaluation of the measurements done in forming the foregoing rows of mould cavities.

The mould member 28 in the mass supply system 2 in FIGS. 17A-17C is, in the present case, a mould plate, but can be also a rotating drum. Rotor 17 of the pump turns here counterclockwise. An insert 27 is provided in the vacuum zone 20 as well as the compression zone 23, respectively. Each insert extends over the entire axial length of the pump. The hopper 3 is connected to the housing 18 via a coupling piece 45 which is preferably a casted part In a preferred embodiment, the rotor 17 does not rotate with a constant speed during one revolution. For example, in the transport zone 21, in which, is shown in FIGS. 17A-17C, each pump chamber 16 is filled with the food mass, the speed of rotation of the rotor is at least reduced, preferably entirely stopped. As soon as the filling of the chamber is completed, the speed of rotation of the rotor is increased and then reduced again, when the subsequent chamber reaches the zone 21. This mode of rotation is especially advantageous in case the pump is operated in the portioning mode, i.e. in case a predetermined volume of food mass has to be placed into each pump chamber 16, respectively. FIG. 17A-17C show further the connection 29 in the end cap(s) to the vacuum source. Preferably, the vacuum channel extends over the entire axial length of the pump, from one end cap to the other end cap, The left drawing of FIGS. 18A-18B shows a vacuum channel 29 in one or both of the end caps 19 which are connected to a vacuum source Reference sign P indicates a recess in the insert or in the housing of the pump wherein a reduced pressure is created. In FIG. 18B, reference sign R indicates a larger recess in the insert in comparison to recess P, in order to increase the vacuumized volume. The dimension of the vacuum channel 29 will be designed such that vacuum will be applied as long as needed to vacuumnize the volume between the vanes. Further it has to be prevented that vacuum will be lost by leakage between the tip of the vanes and the inner surface of the insert. Preferably, the tip of the vanes are in sealing connection with the insert 27 and/or the sides of the vanes are in sealing connection with the end caps, particularly after the vacuum has been established in the respective pump chamber. This assures that no mass flows from the inlet of the pump into the vacuum channel. Further, preferably, it has to be avoided that mass will flow via the outlet of the pump 24 to the vacuum source.

Figure 19:
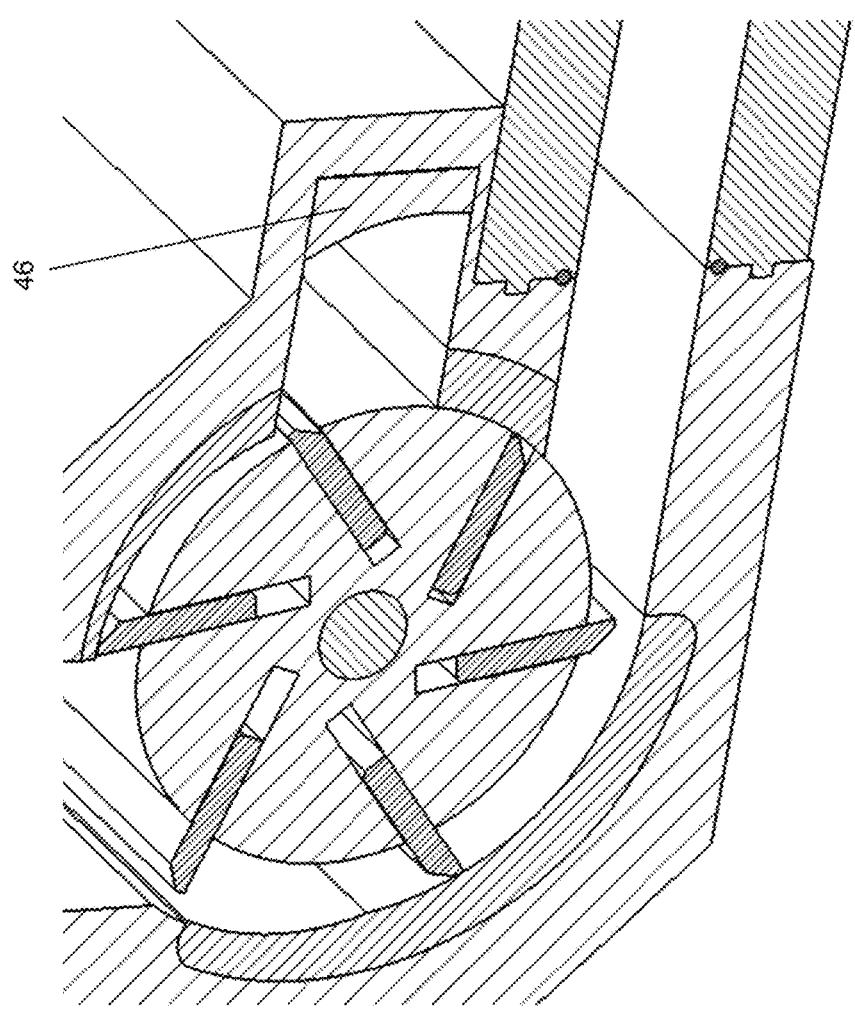
FIG. 19 shows an internal vacuum source.

FIG. 19 shows an embodiment with a vacuum source inside the housing of the pump. In the present case, a piston 46 is used to create a reduced pressure in the pump chamber. The piston reciprocated between two positions. In a similar embodiment not a piston but a membrane can be used to establish a vacuum inside the housing of the pump. A combination of piston and an external vacuum source or a membrane and an external vacuum source is also possible.

Figure 20B:
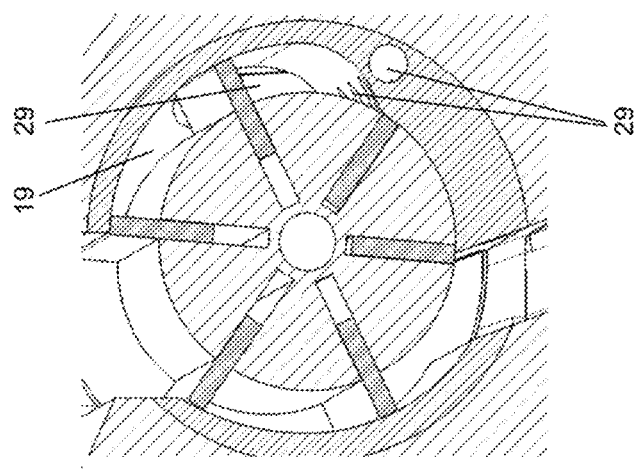
FIGS. 20A and 20B shows a hopper which is directly connected to the housing of the pump.
Figure 20A:
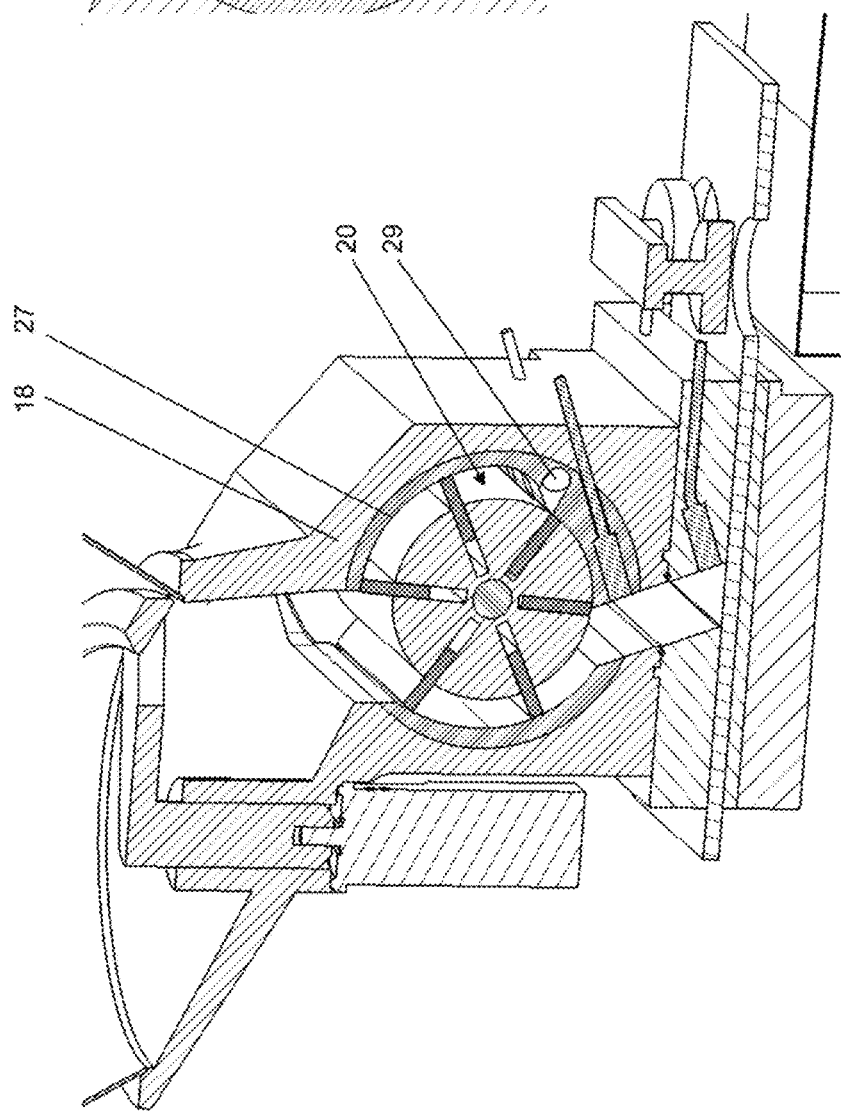

In FIGS. 20A-20B the hopper 3 is directly connected to the housing 18. The rotor is, here, turning counterclockwise. The housing is preferably a one piece casted part. The end cap(s) and also the insert in the vacuum zone are provided with vacuum channels 29. One main vacuum channel extends across the axial length of the insert, from one end cap to the other end cap and several channels are in connection with this main channel and with vacuum zone 20. The design of the vacuum channels is not limited to the described channels but all sorts of alternatives are possible. In the embodiment of FIGS. 20A-20B mass is flowing from above into cavities in the mould plate. In another embodiment (not shown) mass is flowing from below into the cavities in the mould plate. These cavities can be through-holes as shown in this figure or the cavities in the mould plate are made out of porous material which are open only at the bottom side of the mould plate.

The rotor in FIGS. 21A-21B rotates preferably clockwise. The dimension of hopper 3 in some of the previous embodiments is limited in height mainly due to the dimension of a lift unit which will be used when working with meat trolleys. To increase the hopper content, the pump is, in the present case, positioned relatively low.

According to one embodiment of the present invention, the radial length of the vanes and/or the design of the insert(s) is chosen according to the product to be pumped. The vanes 15, the insert(s) 27 and/or the rotor 17 are preferably exchangeable. FIG. 22A shows an embodiment with relatively short vanes 15 and FIG. 22B shows an embodiment with relatively long vanes 15 which is especially suitable for whole muscle material.

All embodiments can be supplied with insert(s) but also without inserts. A vacuum zone is not always necessary. Inserts are exchangeable and a certain food mass can be used in combination with a certain insert to optimize the filling process. The in case a pressure sensor is provided, the number of pressure sensors will depend on how sophisticated the control of the filling process of the cavities has to be. All embodiments are suitable for a mould plate or a mould drum.

LIST OF REFERENCE SIGNS

1 Food product forming apparatus
2 Mass supply system
3 Hopper
4 Rotating feeder
5 Rotating feeder blade
6 Drive means rotating feeder
7 Static mounted feeder
8 Scraper
9 Divider
10 Mass transport means
11 Feed channel
12 Seal
15 Vane
16 Pump chamber
17 Rotor
18 Housing
19 End cap pump housing
20 Vacuum zone
21 Transport zone
22 inlet pump
23 Compression zone
24 Outlet pump
25 Stationary cam
26 Cam track
27 Insert
28 Mould member, Mould drum, Mould plate
29 Vacuum connection/channel
30 Closing part seal
31 Drive unit vane pump 32 Drive unit mould drum
33 Pressure sensor—Pump pressure: pressure in outlet pump
34 Pressure sensor—Filling pressure: pressure in feed channel
35 Pressure sensor—Filling pump chamber
36 Pressure sensor—Efficiency divider
40 Segment circumference mould drum with product cavity
41 Segment circumference mould drum with no product cavity
Mould cavity
Coupling piece
46 Piston means/Membrane means

What is claimed is:

1. A system for forming a product from a food mass, the system comprising:
    a hopper with a rotating feeder;
    a mould drum comprising cavities to form products, the cavities are at least partially made from a porous material; and
    a feed pump with a moving member, the feed pump is configured to pump the food mass from the hopper into the cavities;
    wherein the system comprises means configured to determine:
        i) a position and a motion of the mould drum relative to a frame of the system; and
        ii) a position and a motion of the moving member of the feed pump relative to a housing of the feed pump; and
        iii) a position and a motion of the rotating feeder relative to the hopper to synchronize the motion of the mould drum and the motion of the moving member of the feed pump and to synchronize the motion of the rotating feeder with the motion of the moving member of the feed pump,
    wherein the feed pump is connected to a vacuum source, and
    wherein the system comprises at least two pressure sensors that are arranged between the feed pump and the mould drum, the at least two pressure sensors are configured to determine a pressure distribution over an axial length of the mould drum and over an axial length of an outlet of the feed pump.

2. The system for forming a product from a food mass according to claim 1, wherein the feed pump is a positive displacement pump with a rotor, and
    wherein an axis of rotation of the rotor is in parallel to an axis of rotation of the mould drum.

3. The system for forming a product from a food mass according to claim 1, wherein the feed pump is a vane pump comprising a compression zone and a transport zone, the compression zone is configured to compress the food mass to a desired feed pressure, the vane pump comprising vanes, and
    wherein in both the compression zone and the transport zone, and at an outlet of the feed pump, tips of the vanes are free from touching the housing of the feed pump.

4. The system for forming a product from a food mass according to claim 1, wherein the system comprises a divider located between the feed pump and the mould drum, the divider is directly connected to the housing of the feed pump or integral with the housing of the feed pump.

5. The system for forming a product from a food mass according to claim 1, wherein an axial length of a rotor of the feed pump is generally equal to an axial length of the mould drum.

6. The system according to claim 1, wherein each of the cavities are connected to a fluid passage that extends parallel to an axis of rotation of the mould drum.

7. The system according to claim 2, wherein the positive displacement pump is a portioning device, the portioning device is configured to feed food mass towards the mould member to fill one of the cavities or a row of the cavities, and
    wherein a speed of rotation of the rotor is reduced during filling of the cavities or the rows of the cavities.

8. The system according to claim 1, wherein the mould drum comprises at least one sensor, and
    wherein a discharge of formed products from the cavities is controlled according to a signal from the at least one sensor.

9. A system for forming a product from a food mass, comprising:
    a hopper with a rotating feeder;
    a mould drum; and
    a feed pump with a moving member;
    wherein the mould drum comprises cavities to form products;
    wherein the cavities are at least partially made from a porous material;
    wherein to synchronize a motion of the mould drum and a motion of the moving member of the feed pump, the system comprises means configured to determine:
        i) a position and the motion of the mould drum relative to a frame of the system; and
        ii) a position and the motion of the moving member relative to a housing of the feed pump,
    wherein the feed pump is connected to a vacuum source that is configured to apply vacuum to the feed pump prior to an inlet of the food mass, the vacuum source is provided within the housing of the feed pump,
    wherein the feed pump is a positive displacement pump with a rotor,
    wherein an axis of rotation of the rotor is in parallel to an axis of rotation of the mould drum,
    wherein the positive displacement pump is a portioning device, the portioning device is configured to feed the food mass towards the mould drum to fill one of the cavities or a row of the cavities, a speed of rotation of the rotor is reduced during filling of the cavities, and
    wherein the system comprises at least two pressure sensors that are arranged between the feed pump and the mold drum, the at least two pressure sensors are configured to determine a pressure distribution over an axial length of the mould drum and over an axial length of an outlet of the feed pump.

10. The system according to claim 9, wherein the means is configured to determine:
    a position and a motion of the rotating feeder relative to the hopper.

* * * * *